US009767338B2

United States Patent
Yoon et al.

(10) Patent No.: US 9,767,338 B2
(45) Date of Patent: Sep. 19, 2017

(54) METHOD FOR IDENTIFYING FINGERPRINT AND ELECTRONIC DEVICE THEREOF

(71) Applicant: Samsung Electronics Co., Ltd., Gyeonggi-do (KR)

(72) Inventors: Su-Ha Yoon, Seoul (KR); Su-Young Park, Gyeonggi-do (KR); Eui-Chang Jung, Seoul (KR)

(73) Assignee: Samsung Electronics Co., Ltd (KR)

( * ) Notice: Subject to any disclaimer, the term of this patent is extended or adjusted under 35 U.S.C. 154(b) by 119 days.

(21) Appl. No.: 14/504,041

(22) Filed: Oct. 1, 2014

(65) Prior Publication Data
US 2015/0139511 A1    May 21, 2015

(30) Foreign Application Priority Data
Nov. 21, 2013 (KR) .......... 10-2013-0142438

(51) Int. Cl.
*G06K 9/00* (2006.01)

(52) U.S. Cl.
CPC ....... *G06K 9/0002* (2013.01); *G06K 9/00919* (2013.01)

(58) Field of Classification Search
CPC . G06F 2203/04104; G06F 2203/04106; G06F 2203/04108; G06F 3/041; G06F 3/044
See application file for complete search history.

(56) References Cited

U.S. PATENT DOCUMENTS

| 6,201,886 | B1* | 3/2001 | Nakayama | G06K 9/00006 382/124 |
| 6,314,197 | B1* | 11/2001 | Jain | G06K 9/00087 382/125 |
| 9,024,897 | B2* | 5/2015 | Tanaka | G06F 3/041 345/173 |
| 9,323,407 | B2* | 4/2016 | Midholt | G06F 3/041 |
| 2004/0005087 | A1* | 1/2004 | Hillhouse | G06F 21/32 382/125 |
| 2004/0175023 | A1* | 9/2004 | Svedin | G06K 9/00013 382/124 |
| 2005/0238212 | A1* | 10/2005 | Du | G06K 9/00026 382/124 |
| 2006/0078176 | A1* | 4/2006 | Abiko | G06F 3/03547 382/124 |

(Continued)

FOREIGN PATENT DOCUMENTS

| JP | 2004272458 | 9/2004 |
| KR | 100825773 | 4/2008 |

*Primary Examiner* — Michelle Hausmann
(74) *Attorney, Agent, or Firm* — The Farrell Law Firm, P.C.

(57) ABSTRACT

A method for operating of an electronic device is provided. The method includes: sensing an input on an input device, detecting one axis direction of a fingerprint input or to be input to a fingerprint sensor, based on the sensed input, determining whether the one axis direction of the fingerprint is consistent with a reference direction of a reference fingerprint, when the one axis direction is not consistent with the reference direction, making the one axis direction consistent with the reference direction, and determining whether the fingerprint is consistent with the reference fingerprint.

19 Claims, 30 Drawing Sheets

(56) References Cited

U.S. PATENT DOCUMENTS

| | | | | |
|---|---|---|---|---|
| 2009/0153297 A1* | 6/2009 | Gardner | ............ | G06K 9/00026 340/5.83 |
| 2010/0266168 A1* | 10/2010 | Wang | .................... | G06K 9/001 382/124 |
| 2010/0273533 A1* | 10/2010 | Cho | ................... | G06F 3/04886 455/566 |
| 2012/0281890 A1* | 11/2012 | Kamakura | ......... | G06K 9/00067 382/126 |
| 2013/0076485 A1* | 3/2013 | Mullins | .................. | G06F 21/32 340/5.83 |
| 2013/0097550 A1* | 4/2013 | Grossman | ............ | G06F 3/0488 715/779 |
| 2013/0283057 A1* | 10/2013 | Hama | .................. | H04L 9/3231 713/186 |

\* cited by examiner

Registered Fingerprint Image

Registered Fingerprint Image

METHOD FOR IDENTIFYING FINGERPRINT AND ELECTRONIC DEVICE THEREOF

PRIORITY

This application claims priority under 35 U.S.C. §119 to Korean Patent Application Serial No. 10-2013-0142438, which was filed in the Korean Intellectual Property Office on Nov. 21, 2013, the entire content of which is incorporated herein by reference.

BACKGROUND

1. Field of the Invention

The present invention relates generally to a method for identifying a fingerprint and an electronic device thereof.

2. Description of the Related Art

Today, a variety of electronic devices, such as mobile phones, Portable Multimedia Players (PMPs), tablet Personal Computers (PCs), Personal Digital Assistants (PDAs), Moving Picture Experts Group Layer-3 (MP3) players, etc., are widely used as necessities in a modern society. In addition, as advanced science technology is developing, electronic devices equipped with a fingerprint identifying function have increasingly been used.

The fingerprint identifying function is for recognizing a specific person by obtaining a fingerprint image and comparing the fingerprint image with a stored fingerprint image by using the fact that every person has a unique fingerprint. Such a fingerprint identifying function is widely used in various fields, including in the security system and authentication technology fields.

SUMMARY

An aspect of the present invention is to solve at least the above-mentioned problems and/or disadvantages and to provide at least the advantages described below.

Another aspect of the present invention is to provide a method for identifying a fingerprint, which performs authentication by using the fingerprint, and an electronic device thereof.

Another aspect of the present invention is to provide a method for identifying a fingerprint, which can improve fingerprint identification performance and to perform a corresponding function according to a fingerprint input direction, and an electronic device thereof.

Another aspect of the present invention is to provide a method for identifying a fingerprint, which recognizes a gesture for fingerprint authentication and intuitively operates, and an electronic device thereof.

According to an aspect of the present invention, a method for operating of an electronic device includes sensing an input on an input device, detecting one axis direction of a fingerprint input or to be input to a fingerprint sensor based on the sensed input, determining whether the one axis direction of the fingerprint is consistent with a reference direction of a reference fingerprint, when the one axis direction is not consistent with the reference direction, making the one axis direction consistent with the reference direction, and determining whether the fingerprint is consistent with the reference fingerprint.

According to another aspect of the present invention, an electronic device is provided. The electronic device includes an input device; a fingerprint sensor; a memory; and at least one processor, wherein the processor is configured to sense an input on the input device detect one axis direction of a fingerprint input or to be input to the fingerprint sensor, based on the sensed input, determine whether the one axis direction of the fingerprint is consistent with a reference direction of a reference fingerprint, when the one axis direction is not consistent with the reference direction, make the one axis direction consistent with the reference direction, and determine whether the fingerprint is consistent with the reference fingerprint.

According to another embodiment of the present invention, a non-transitory computer readable storage medium which, when being executed by an electronic device, stores one or more programs is provided. The programs including instructions for allowing the electronic device to sense an input on an input device, detect one axis direction of a fingerprint input or to be input to a fingerprint sensor, based on the sensed input, determine whether the one axis direction of the fingerprint is consistent with a reference direction of a reference fingerprint, when the one axis direction is not consistent with the reference direction, make the one axis direction consistent with the reference direction, and determine whether the fingerprint is consistent with the reference fingerprint.

BRIEF DESCRIPTION OF THE DRAWINGS

The above and other aspects, features and advantages of certain embodiments of the present invention will become more apparent from the following detailed description when taken in conjunction with the accompanying drawings in which.

DETAILED DESCRIPTION OF EMBODIMENTS OF THE PRESENT INVENTION

Various embodiments of the present invention will be described below with reference to the accompanying drawings. In the following description, detailed descriptions of well-known functions or configurations will be omitted since they may unnecessarily obscure the subject matter of the present invention. Also, the terms used herein are defined according to the functions of the present invention. Thus, the terms may vary depending on users' or operators' intentions or practices. Therefore, the terms used herein should be understood based on the descriptions made herein.

In explaining embodiments of the present invention, an electronic device including a fingerprint sensor will be illustrated and explained. However, this should not be considered as limiting. For example, the electronic device including a fingerprint sensor may include one or more of a smartphone, a tablet PC, a mobile phone, a video phone, an electronic book reader, a desktop PC, a laptop PC, a net book computer, a PDA, a PMP, an MP3 player, an accessory, an electronic appcessory, a camera, a wearable device, a wrist watch, a refrigerator, an air conditioner, a cleaner, an artificial intelligence robot, a Television (TV), a Digital Video Disk (DVD) player, a stereo, an oven, a microwave oven, a washing machine, an electronic bracelet, an electronic necklace, an air cleaner, an electronic album, a medical device, a navigation device, a satellite signal receiver, an Event Data Recorder (EDR), a Flight Data Recorder (FDR), a set-top box, a TV box, an electronic dictionary, a car infotainment device, electronic equipment for ships, avionics, a security device, electronic clothing, an electronic key, a camcorder, a game console, a Head-Mounted-Display (HMD), a flat panel display device, an electronic album, a part of furniture or a building/structure equipped with an electronic device, an electronic board, an electronic signature receiving device, and a projector.

Figure 1:
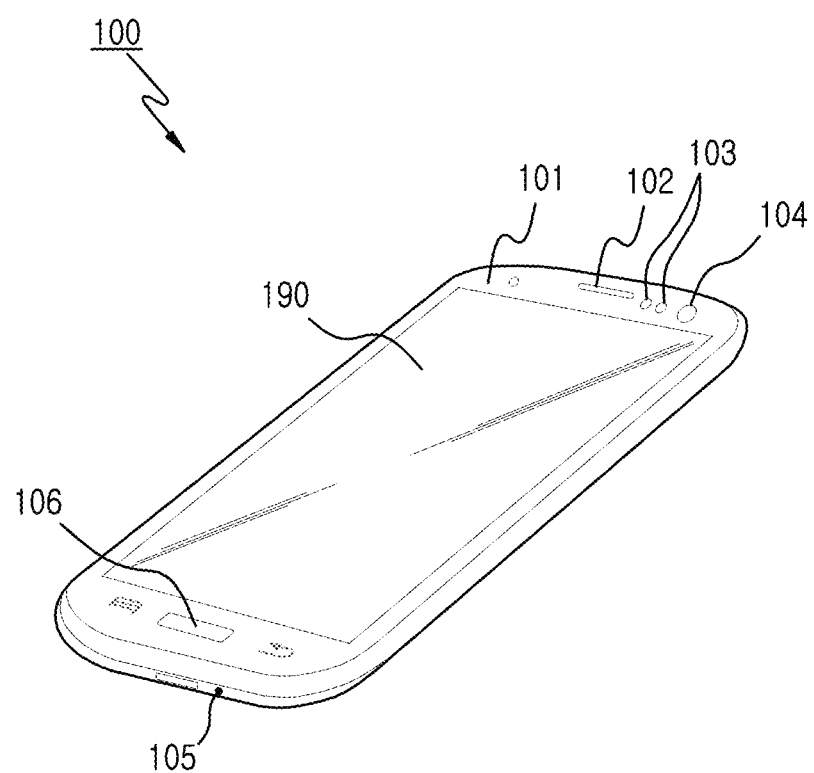
FIG. 1 is a perspective view of an electronic device, according to an embodiment of the present invention.

FIG. 1 is a perspective view illustrating an electronic device, according to an embodiment of the present invention.

Referring to FIG. 1, the electronic device 100 includes a touch screen 190 formed on a front surface 101 thereof. The touch screen 190 displays an electronic signal transmitted from the electronic device 100 as an image, such as a text, a graphic, a video, etc. In addition, the touch screen 190 may apply a touch panel and thus is capable of inputting and outputting data simultaneously. Such a touch screen 190 receives data via an inputting means such as a finger or a stylus.

The touch screen 190 may use not only capacitance, resistance, infrared and surface sound wave techniques, but also any multi-touch sense technique including other proximity sensor arrays or other elements. The touch screen 190 can recognize a touch based on a change in a physical quantity (e.g., a capacitance or resistance, etc.) caused by a contact of a finger or a stylus, and can sense an operation such as flicking, touch and drag, tap and hold, multi-tap, etc.

In addition, the touch screen 190 may recognize a hovering input (contactless touch or proximity touch) for sensing an approach of an inputting means, such as a finger or stylus, toward the touch screen 190 within a predetermined distance.

An ear piece 102 is disposed at an upper side of the touch screen 190 to receive a voice. A plurality of sensors 103, such as a proximity sensor or an illuminance sensor, for convenience of use of the electronic device 100, and a camera device 104 for photographing a subject, are located in the proximity of the ear piece 102.

The electronic device 100 includes a microphone device 105, disposed at a lower side of the touch screen 190 to receive a sound, and a key button 106 for a specific function. The key button 106 may be a home key and may be equipped with a fingerprint sensor (referred to as a fingerprint identification sensor) to authenticate a user.

The fingerprint sensor reads out a user's fingerprint, extracts characteristics of the fingerprint, and stores the characteristics of the fingerprint in a memory of the electronic device 100 during a user registration process. Thereafter, when a user's finger is sensed by the fingerprint sensor, the electronic device 100 receives the fingerprint and performs authentication by comparing the fingerprint with an original fingerprint stored in the memory.

Figure 4A:
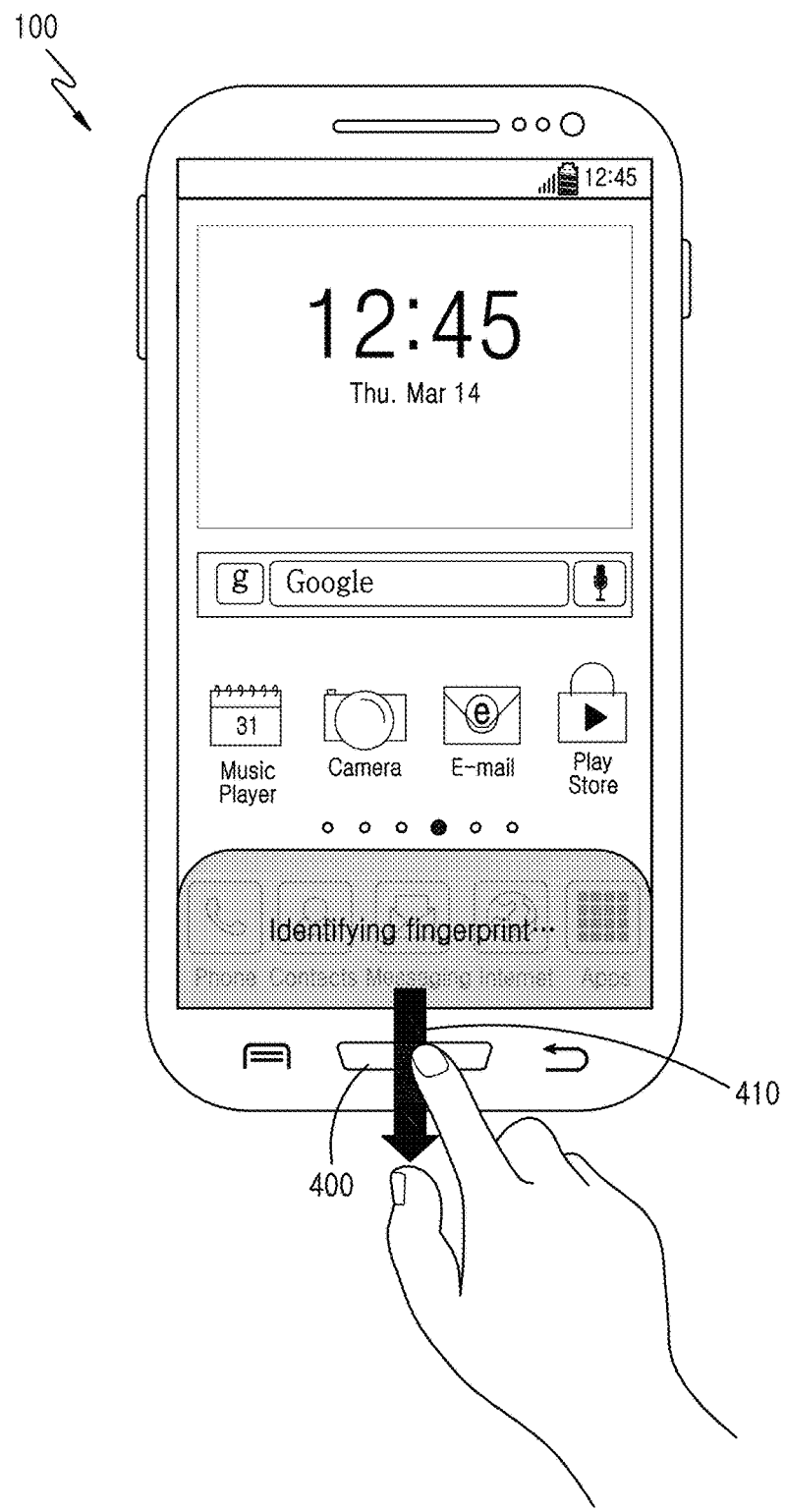
FIGS. 4A and 4B are views illustrating a gesture for fingerprint identification, according to an embodiment of the present invention.
Figure 4B:
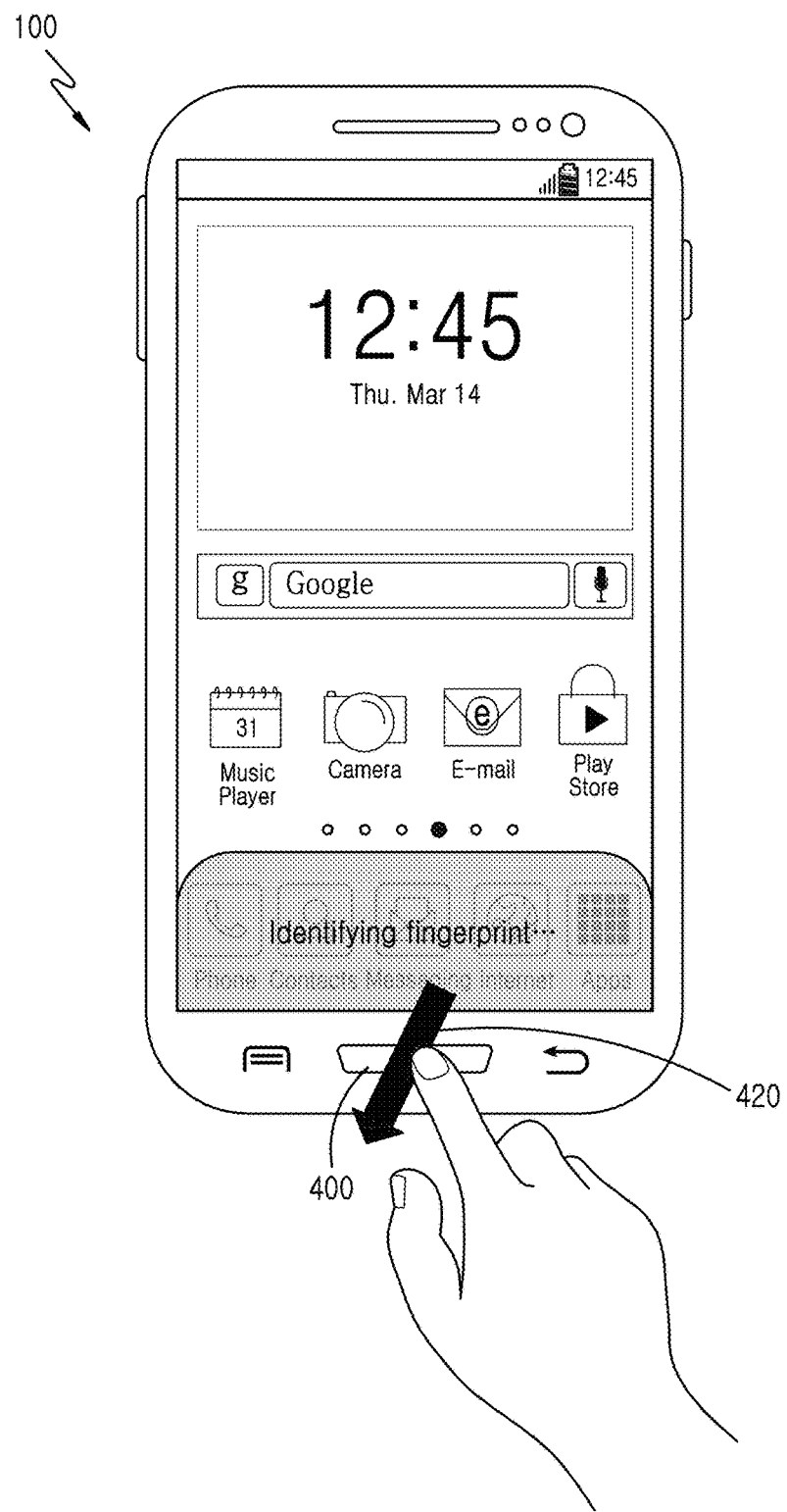

FIGS. 4A and 4B are views illustrating a gesture for fingerprint identification, according to an embodiment of the present invention.

Referring to FIG. 4A, when a home key 400 is equipped with the fingerprint sensor, the electronic device 100 may perform fingerprint authentication by sensing a first swipe 410 operation in a downward direction on the home key 400. However, this should not be considered as limiting. The electronic device 100 may alternatively perform fingerprint authentication by sensing an upward swipe or a diagonal swipe on the home key 400, for example.

Figure 8A:
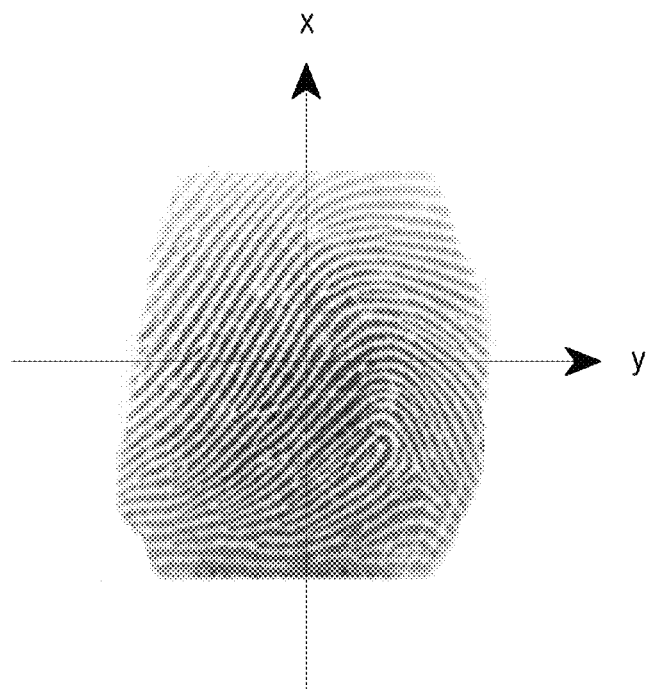
FIGS. 8A to 8B are views illustrating a method for making one axis direction of an input fingerprint consistent with a reference direction of a registered fingerprint, according to an embodiment of the present invention.
Figure 8B:
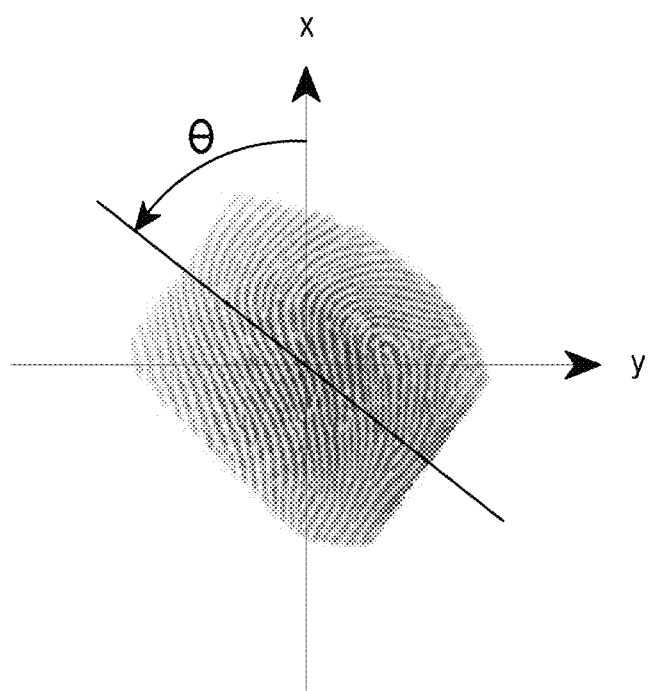

FIGS. 8A to 8B are views illustrating a method for making one axis direction of an input fingerprint consistent with a reference direction of a registered fingerprint, according to an embodiment of the present invention.

Referring to FIG. 8A, when a fingerprint image registered during a user registration process is registered with reference to a major axis direction (e.g. x-axis direction), the electronic device 100 may perform fingerprint authentication by sensing the first swipe 410 operation in the downward direction on the home key 400. Alternatively, the electronic device 100 may perform fingerprint authentication by sensing the diagonal swipe operation on the home key 400.

As shown in FIG. 4B, the electronic device 100 may perform fingerprint authentication by sensing a second swipe 420 operation swiping from the upper-right side to the lower-left side. In this case, the electronic device 100 makes one axis direction of an input fingerprint image consistent with one axis direction of an already registered fingerprint image to perform fingerprint authentication.

According to an embodiment of the present invention, the fingerprint sensor is installed in the key button 106. However, this should not be considered as limiting. For example, the fingerprint sensor may be installed in various locations such as the front surface 101, a rear surface, or a side surface of the electronic device 100.

Figure 2:
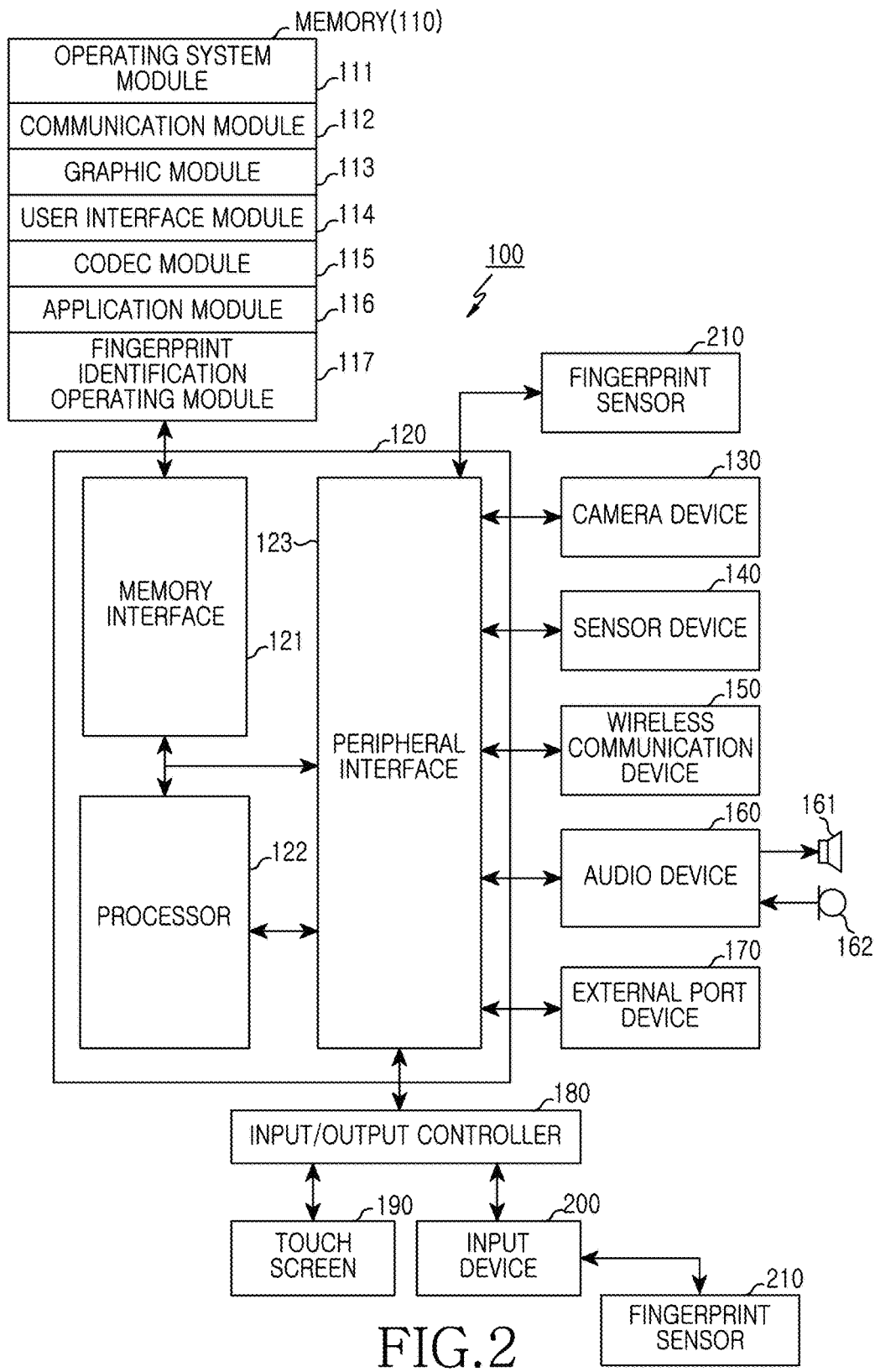
FIG. 2 is a block diagram of an electronic device, according to an embodiment of the present invention.

FIG. 2 is a block diagram of an electronic device 100, according to an embodiment of the present invention.

Referring to FIG. 2, the electronic device 100 may be a device such as a PDA, a laptop computer, a mobile phone, a smartphone, a net book, a handheld computer, a Mobile Internet Device (MID), a media player, a Ultra Mobile PC (UMPC), a tablet PC, a notebook PC, a watch, a navigation device, an MP3 player, a camera, or a wearable device. In addition, the electronic device 100 may be any device which includes a device combining two or more functions of the above-mentioned devices.

According to an embodiment of the present invention, the electronic device 100 includes a memory 110, a processor unit 120, a camera device 130, a sensor device 140, a wireless communication device 150, an audio device 160, an external port device 170, an input/output controller 180, a touch screen 190, an input device 200, and a fingerprint sensor 210. A plurality of memory 110 and the external port device 170 may be provided.

The processor unit 120 includes a memory interface 121, at least one processor 122, and a peripheral interface 123. The memory interface 121, the at least one processor 122, and the peripheral interface 123 included in the processor unit 120 may be integrated into at least one integrated circuit or may be implemented as separate elements.

The memory interface 121 controls access of the elements such as the processor 122 or the peripheral interface 123 to the memory 110.

The peripheral interface 123 controls a connection between an input/output peripheral of the electronic device 100 and the processor 122 and the memory interface 121.

The processor 122 controls the electronic device 100 to provide various multimedia services by using at least one software program. The processor 122 executes at least one program stored in the memory 110 and provides a service corresponding to the program. Such a processor 122 may include one or more Application Processors (APs) or one or more Communication Processors (CPs).

The processor 122 performs various functions for the electronic device 100 by executing various software programs, and processes and controls voice communication, video communication, and data communication. In addition, the processor 122 may perform methods of the embodiments of the present invention by interworking with software modules stored in the memory 110.

The processor 122 may include at least one data processor, an image processor, or a COding DECoding (CODEC). Furthermore, the electronic device 100 may include the data processor, the image processor, or the CODEC as separate elements.

The various elements of the electronic device 100 may be connected with one another via one or more communication buses or by an electric connecting means.

The camera device 130 performs a camera function such as photographing, video clipping, recording, etc. The camera device 130 may include a Charged Coupled Device (CCD), a Complementary Metal-Oxide Semiconductor (CMOS), etc. In addition, the camera device 130 may change hardware configurations, for example, the camera device may adjust a lens movement or the number of apertures according to a camera program executed by the processor 122. Such a camera device 130 may be implemented in a closed loop method which applies a feedback principle.

The camera device 130 may provide a collection image which is acquired by photographing a subject to the processor 122. The camera device 130 may include an image sensor to convert an optical signal into an electric signal, an image signal processor to convert an analogue image signal into a digital image signal, and a digital signal processor to image-process the image signal output from the image signal processor to be displayed on the touch screen 190. The camera device 130 may include an actuator to move the lens, a driver Integrated Circuit (IC) to drive the actuator, etc.

The sensor device 140 may include a proximity sensor, a hall sensor, an illuminance sensor, a motion sensor, etc. For example, the proximity sensor senses an object approaching the electronic device 100, and the hall sensor senses a magnetism of a metal body. In addition, the illuminance sensor senses ambient light of the electronic device 100, and the motion sensor may include an acceleration sensor or a gyro sensor to sense a motion of the electronic device 100. However, this should not be considered as limiting and the sensor device 140 may further include various sensors to perform other well-known additional functions.

The wireless communication device 150 enables wireless communication and may include a Radio Frequency (RF) transmitter/receiver or a light (infrared ray) transmitter/receiver. Although not shown, the wireless communication device 150 may include an RF IC unit and a baseband processor. The RF IC unit transmits/receives electromagnetic waves, and converts a baseband signal from the baseband processor into electromagnetic waves and transmits the electromagnetic waves via an antenna.

The RF IC unit may include an RF transceiver, an amplifier, a tuner, an oscillator, a digital signal processor, a CODEC chip set, a Subscriber Identification Module (SIM) card, etc.

The wireless communication device 150 may be implemented to be operated via at least one of a Global System for Mobile Communication (GSM) network, an Enhanced Data GSM Environment (EDGE) network, a Code Division Multiple Access (CDMA) network, a Wideband Code Division Multiple Access (W-CDMA) network, a Long Term Evolution (LTE) network, an Orthogonal Frequency Division Multiple Access (OFDMA) network, a Wi-Fi network, WiMax network, a Near Field Communication (NFC) network, an Infrared Data Association (IrDA) network, and a Bluetooth network. However, this should not be considered as limiting and the wireless communication device 150 may adopt various communication schemes using protocols for an e-mail, instant messaging or Short Message Service (SMS).

The audio device 160 may be connected to a speaker 161 and a microphone 162 to perform an audio input and output function such as voice recognition, voice reproduction, digital recording, and telephony functions. The audio device 160 provides an audio interface between the user and the electronic device 100, and converts a data signal received from the processor 122 into an electronic signal and outputs the converted electronic signal via the speaker 161.

The speaker 161 converts the electronic signal into an audible frequency band and outputs the audible frequency band, and may be disposed on a front or rear portion of the electronic device 100. The speaker 161 may include a flexible film speaker in which at least one piezoelectric member is attached to a single vibration film.

The microphone 162 converts a sound wave transmitted from a person or other sound sources into an electronic signal. The audio device 160 receives the electronic signal from the microphone 162, converts the received electronic signal into an audio data signal, and transmits the converted audio data signal to the processor 122. The audio device 160 may include an earphone, an earset, a headphone, or a headset which is attachable to and detachable from the electronic device 100.

The external port device 170 connects the electronic device 100 to other electronic devices directly or indirectly via a network (e.g., Internet, Intranet, wireless LAN, etc.). The external port device 170 may include a Universal Serial Bus (USB) port, a FIREWIRE port, etc.

The input/output controller 180 provides an interface between an input/output device such as the touch screen 190, the input device 200, and the fingerprint sensor 210, and the peripheral interface 123. The input/output controller 180 may include a touch screen controller and other input device controllers.

The touch screen 190 provides an input/output interface between the electronic device 100 and the user. The touch screen 190 transmits touch information of the user to the processor 122 by applying a touch sensing technology, and shows visual information, a text, a graphic, or a video provided from the processor 122 to the user.

The touch screen 190 may display state information of the electronic device 100, a text which is input by the user, a moving image, and a still image. In addition, the touch screen 190 may display information related to an application which is driven by the processor 122.

The touch screen 190 may use not only capacitance, resistance, infrared and surface sound wave techniques, but also any multi-touch sense technique including other proximity sensor arrays or other elements. Such a touch screen 190 may apply at least one of a Liquid Crystal Display (LCD), an Organic Light Emitting Diode (OLED), an Active Matrix Organic Light Emitting Diode (AMOLED), a Thin Film Transistor (TFT)-LCD, a flexible display, and a 3-dimensional display.

The touch screen 190 recognizes a touch based on a change in a physical quantity (e.g., a capacitance or resistance, etc.) caused by a contact of a finger or a stylus, and can sense an operation such as flicking, touch and drag, tap and hold, multi-tap, etc. In addition, the touch screen 190 may be implemented to recognize a hovering input (contactless touch or proximity touch) for sensing an approach of an inputting means such as a finger or stylus toward the touch screen 190 within a predetermined distance.

The input device 200 provides input data which is generated by a user's selection to the processor 122 via the input/output controller 180. The input device 200 may include a keypad including at least one hardware button and a touch pad for sensing touch information.

The input device 200 may include an up/down button to control a volume. In addition, the input device 200 may include at least one of a push button, a locker button, a locker switch, a thumb-wheel, a dial, a stick, a mouse, a track-ball or a pointer device such as a stylus, which are given corresponding functions.

The fingerprint sensor 210 identifies a fingerprint to authenticate the user. The fingerprint sensor 210 reads a user's fingerprint, extracts characteristics of the fingerprint, and stores the characteristics in the memory 110 of the electronic device 100 during a user registration process. Thereafter, when a user's finger is sensed by the fingerprint sensor 210, the electronic device 100 receives a fingerprint and performs authentication by comparing the fingerprint and a registered fingerprint stored in the memory 110.

The fingerprint sensor 210 may be connected with the peripheral interface 123. However, this should not be considered as limiting. The fingerprint sensor 210 may be connected with the input/output controller 180.

The memory 110 may include a fast random access memory, such as one or more magnetic disc storage devices or a non-volatile memory, one or more optical storage devices, or a flash memory (e.g., NAND or NOR).

The memory 110 stores a software component. The software component includes an operating system module 111, a communication module 112, a graphic module 113, a user interface module 114, a CODEC module 115, an application module 116, and a fingerprint identification operating module 118. The module can also be expressed as a group of instructions, an instruction set, or a program.

The operating system module 111 may include an embedded operating system such as WINDOWS, LINUX, Darwin, RTXC, UNIX, OS X, Android or VxWorks, and may include various software components for controlling a general system operation. The control of the general system operation may include memory control and management, storage hardware (device) control and management, power control and management, etc. In addition, the operating system module 111 may perform a function for facilitating communication between various hardware elements (devices) and software elements (modules).

The communication module 112 enables communication with other electronic devices, such as a computer, a server, and an electronic device via the wireless communication device 150 or the external port device 170.

The graphic module 113 may include various software components for providing and displaying graphics on the touch screen 190. The terminology of "graphics" indicates a text, a web page, an icon, a digital image, a video, an animation, etc.

The user interface module 114 may include various software components related to a user interface. The user interface module 114 controls to display information related to an application which is driven by the processor 122 on the touch screen 190. In addition, the user interface module 114 may include the content related to how a state of the user interface changes and in which condition the state of the user interface changes.

The CODEC module 1may include a software component related to encoding and decoding of a video file.

The application module 116 may include a software component for at least one application installed in the electronic device 100. Such an application may include a browser, an e-mail, a phone book, a game, a short message service, a multimedia message service, a Social Networking Service (SNS), instant messaging, an alarm service, an MP3 player, schedule management, a drawing board, a camera, word processing, keyboard emulation, a music player, an address book, a contact list, a widget, a Digital Right Management (DRM), voice recognition, voice reproduction, a location determining function, a location-based service, a user authentication service, etc. The application can be expressed as an application program.

The fingerprint identification operating module 117 may include various software components for identifying a fingerprint at the fingerprint sensor 210. The fingerprint identification operating module 117 may store information on an original fingerprint image registered during a user registering process, and may determine whether an input direction of an input fingerprint image is consistent with an input direction of the original fingerprint image.

The processor unit 120 may further include an additional module (instructions) in addition to the above-described modules.

The various functions of the electronic device 100 may be executed by hardware or software including one or more processing or application specific integrated circuits (ASIC).

The electronic device 100 may include a power system for supplying power to the various elements included in the electronic device 100. The power system may include a power source (alternating current power source or battery), a power error detection circuit, a power converter, a power inverter, a charging device, or a power state display device (light emitting diode). In addition, the electronic device 100 may include a power management and control device for generating, managing, and distributing power.

According to an embodiment of the present invention, the elements of the electronic device 100 have been illustrated and explained, but are not limited to those described above. For example, the electronic device 100 may include a larger or smaller number of elements than those illustrated in the drawing.

Figure 3:
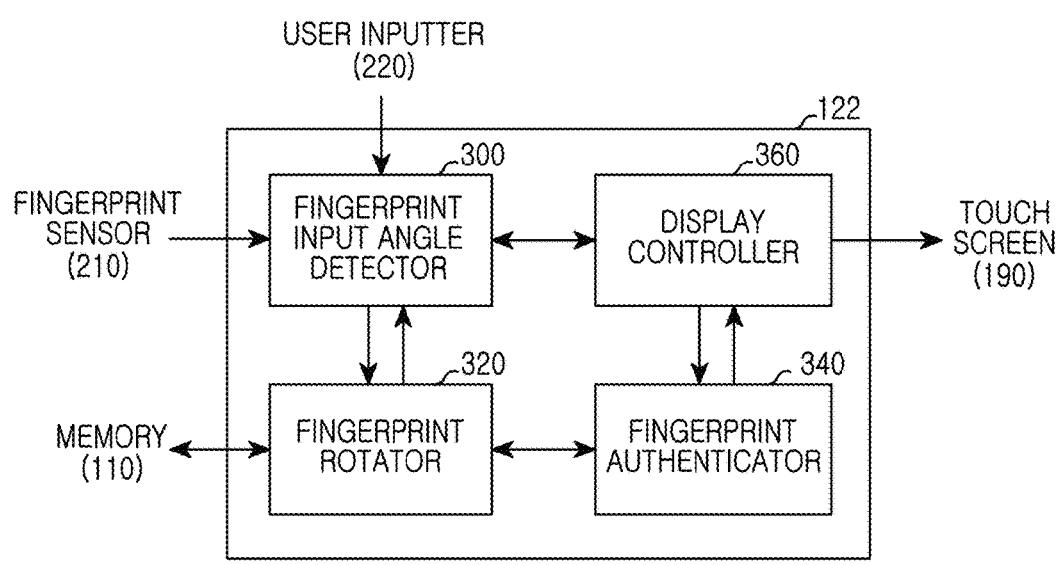
FIG. 3 is a block diagram of a processor, according to an embodiment of the present invention.

FIG. 3 is a block diagram of a processor, according to an embodiment of the present invention.

Referring to FIG. 3, the processor 122 includes a fingerprint input angle detector 300, a fingerprint rotator 320, a fingerprint authenticator 340, and a display controller 360.

The elements of the processor 122 may be implemented as separate modules or may be included in a single module as software elements.

The fingerprint input angle detector 300 detects a fingerprint input angle by using fingerprint information provided by the fingerprint sensor 210 and finger location information provided by a user inputter 220. For example, the fingerprint input angle detector 300 estimates an incidence angle of a finger input to the fingerprint sensor 210 via the user inputter 220. In addition, the fingerprint input angle detector 300 calculates an incidence angel of a finger input to the fingerprint sensor 210 on a real time basis by estimating a change in the incidence angle of a finger to be input to the fingerprint sensor 210 via the user inputter 220.

The user inputter 220 may include the touch screen 190 or the camera device 130. However, this should not be considered as limiting.

The fingerprint input angle detector 300 acquires location information of a finger via the touch screen 190.

Figure 5A:
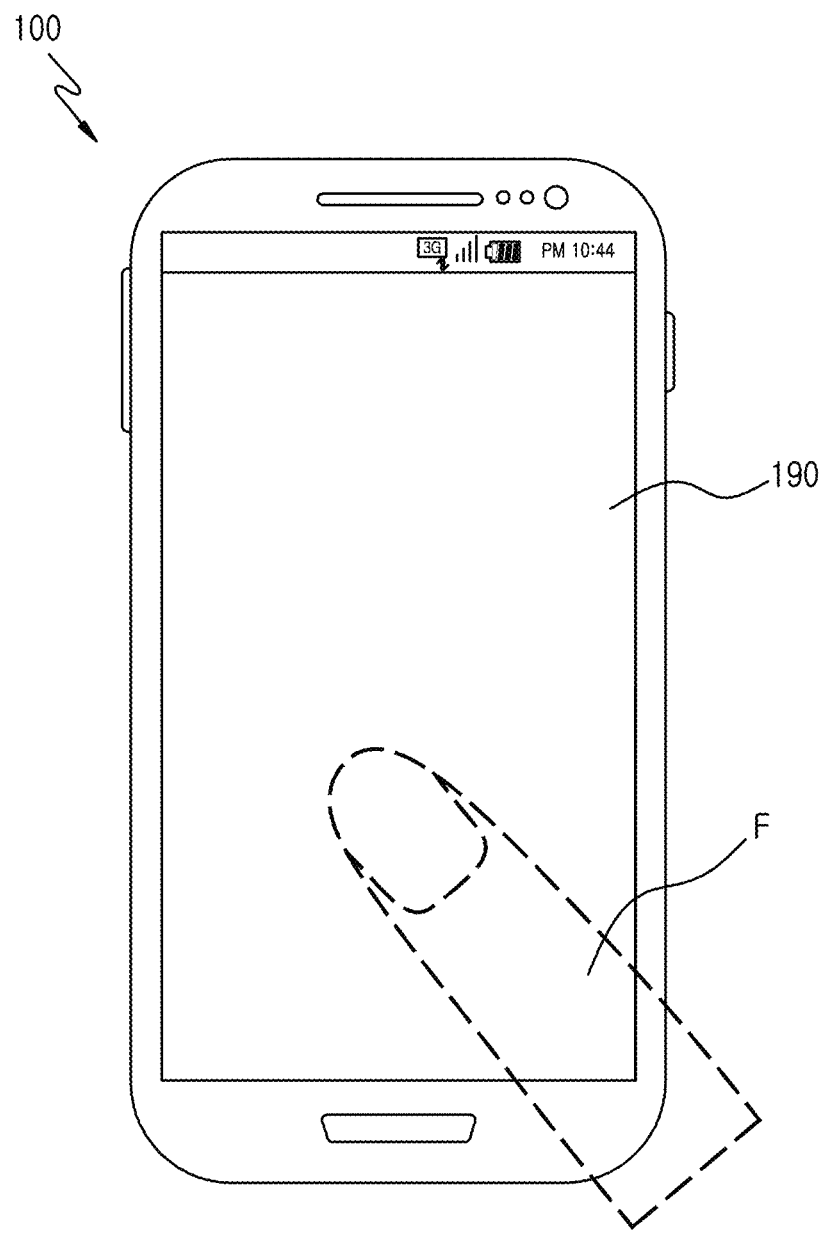
FIGS. 5A to 5C are views illustrating a method for estimating a fingerprint input direction, according to an embodiment of the present invention.
Figure 5B:
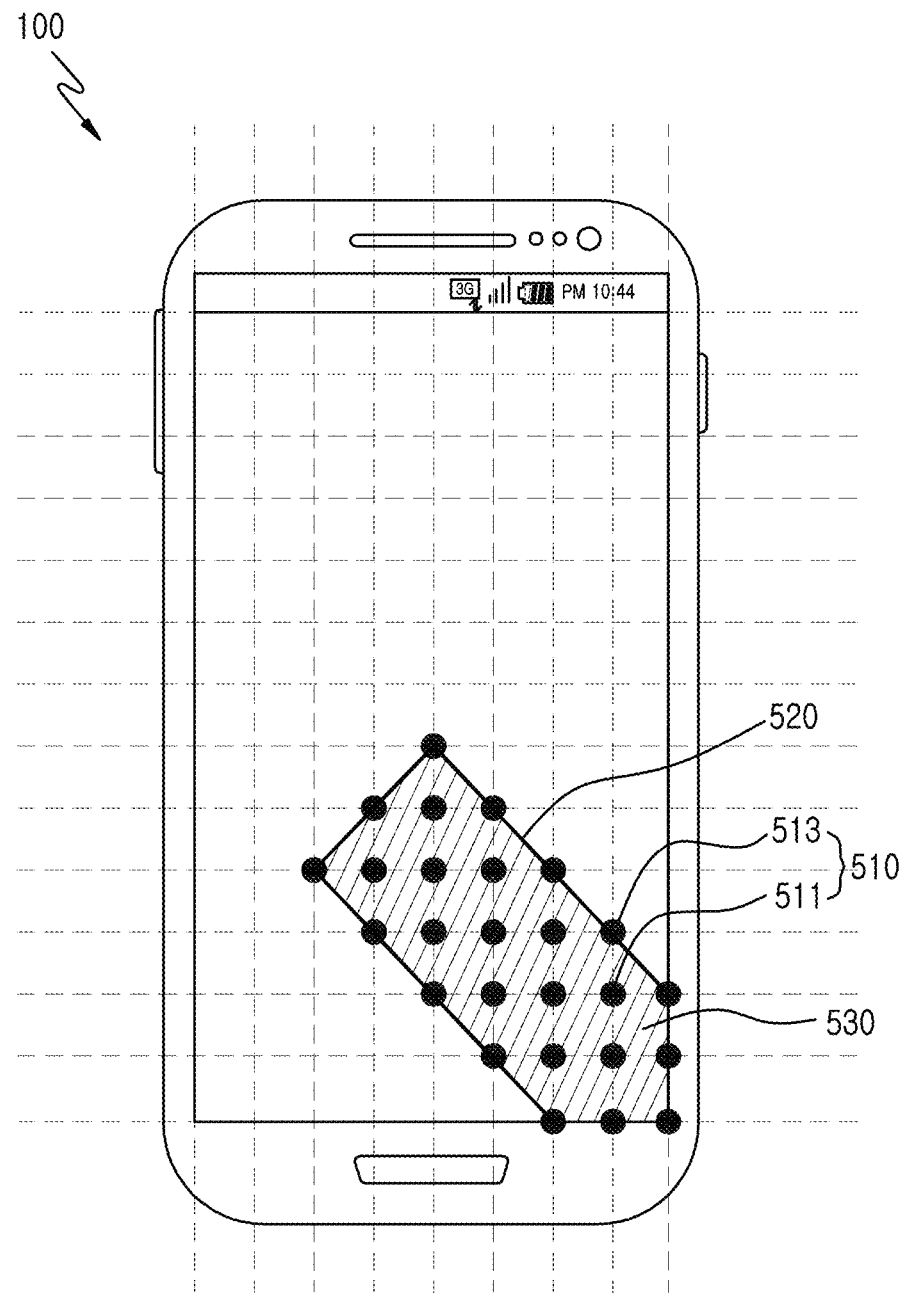
Figure 5C:
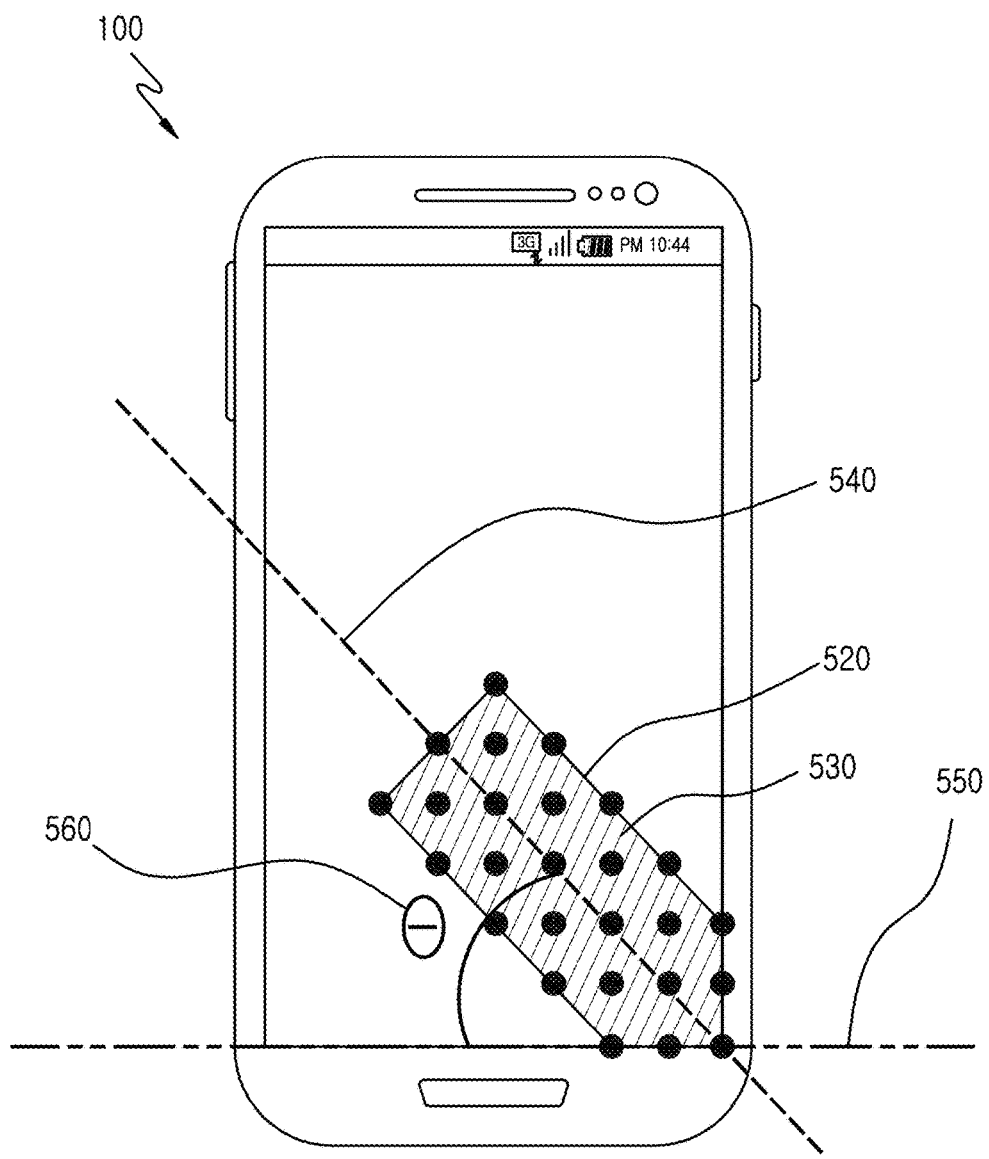

FIGS. 5A to 5C are views illustrating a method for estimating a fingerprint input direction, according to an embodiment of the present invention.

Referring to FIG. 5A, the touch screen 190 may sense a touch and hovering by a finger F. For example, the touch screen 190 may determine a hover area by sensing the finger F approaching within a predetermined distance.

As shown in FIG. 5B, where the surface of the touch screen 190 is illustrated in a grid pattern, including an x-axis and a y-axis, the touch screen 190 detects location coordinates 510 of the finger F contacting the surface of the touch screen 190 or approaching within a predetermined distance.

The fingerprint input angle detector 300 defines a hover area 530 (or a touch area), based on a closed curve 520 connecting outermost location coordinates (e.g., 513, etc.) from among the location coordinates (e.g., 511, 513, etc.) provided by the touch screen 190. The hover area 530 may be defined by, but not limited to, the number of pixels located in the closed curve 520.

As shown in FIG. 5C, the fingerprint input angle detector 300 sets a virtual center line 540 on a center of the hover area 530, according to the defined hover area 530. In addition, the fingerprint input angle detector 300 determines in which direction one axis (e.g., a major axis) of the hover area 530 is oriented, based on the defined hover area 530. Accordingly, the fingerprint input angle detector 300 sets the center line 540 connecting from the upper left side to the lower right side through the defined hover area 530.

Alternatively, the fingerprint input angle detector 300 may find a plurality of lines parallel to the above-described direction from among the closed lines 520 and set the line located in the center from among the plurality of lines as the virtual center line 540.

Thereafter, the fingerprint input angle detector 300 detects an angle 560 between the determined center line 540 and a horizontal line 550 parallel to the fingerprint sensor. The fingerprint input angle detector 300 determines whether the input angle 560 is consistent with a reference input angle by comparing the input angle 560 of the input fingerprint with a reference input angle of a registered reference fingerprint.

The fingerprint input angle detector 300 may acquire location information of a finger by using the camera device 130. In this case, the camera device 130 may be installed in the proximity of the fingerprint sensor 210 of the electronic device 100. The camera device 130 may sense a movement of the finger by photographing a subject approaching the camera device 130 by using a wide-angle lens.

The camera device 130 recognizes a characteristic point of the finger or a fingerprint image and tracks the finger, and provides the finger image to the fingerprint input angle detector 300. The fingerprint input angle detector 300 estimates an input direction of the fingerprint input to the fingerprint sensor 210, based on the finger image in the above-described method.

The fingerprint input angle detector 300 estimates an input direction or an input angle of a finger to be input to the fingerprint sensor 210 in the above-described method. However, this should not be considered as limiting and the input direction of the fingerprint may be estimated by using a geomagnetic sensor or other methods.

The fingerprint rotator 320 makes one axis direction of the fingerprint image input to the fingerprint sensor 210 consistent with a reference direction of the registered reference fingerprint image, according to the fingerprint information provided by the fingerprint input angle detector 300.

Figure 9A:
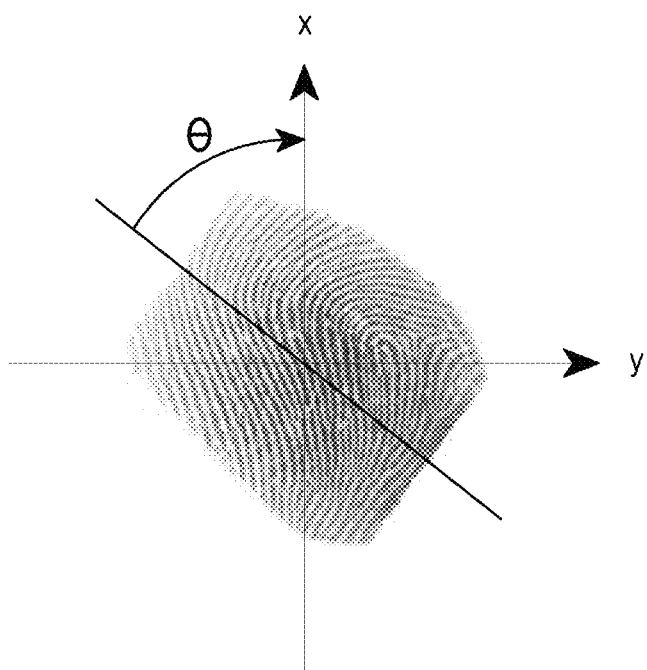
FIGS. 9A to 9B are views illustrating a method for making one axis direction of an input fingerprint consistent with a reference direction of a registered fingerprint, according to another embodiment of the present invention.
Figure 9B:
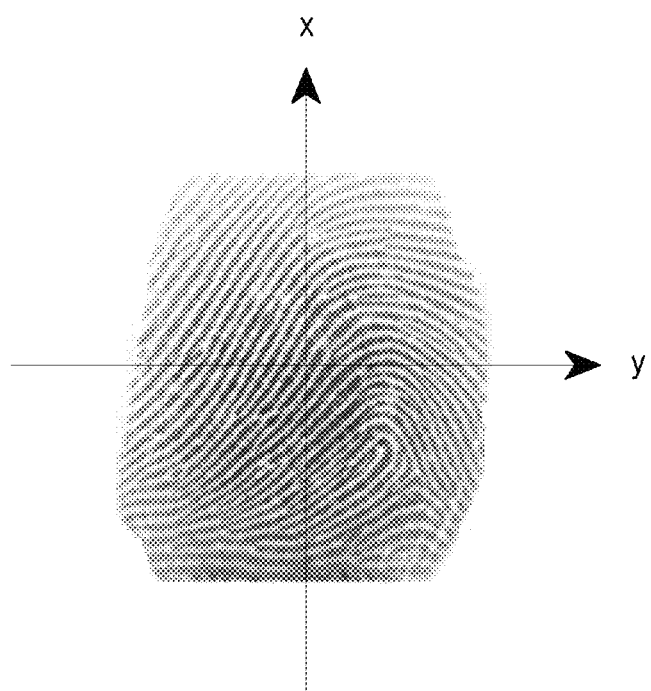

FIGS. 9A to 9B are views illustrating a method for making one axis direction of an input fingerprint consistent with a reference direction of a registered fingerprint, according to another embodiment of the present invention.

Referring to FIGS. 9A and 9B, when a fingerprint image is registered with reference to one axis direction, as shown in FIG. 8A, and a fingerprint image is input to the fingerprint sensor 210, as shown in FIG. 9A, the fingerprint rotator 320 makes one axis direction of the input fingerprint image consistent with one axis direction of the registered fingerprint image by rotating the input fingerprint image by a predetermined angle. Accordingly, the input fingerprint image is rotated, as shown in FIG. 9B, and the rotated fingerprint image matches the registered fingerprint image with reference to one axis direction.

Alternatively, when a fingerprint image is registered with reference to one axis direction, as shown in FIG. 8A, and a fingerprint image is input to the fingerprint sensor 210, as shown in FIG. 9A, the fingerprint rotator 320 makes one axis direction of the registered fingerprint image consistent with one axis direction of the input fingerprint image by rotating the registered fingerprint image by a predetermined angle. Accordingly, the registered fingerprint image is rotated, as shown in FIG. 8B, and the rotated fingerprint image matches the input fingerprint image with reference to one axis direction.

However, this should not be considered as limiting. There may be various methods for making the one axis direction of the registered fingerprint image and the one axis direction of the input fingerprint image consistent with each other.

The fingerprint authenticator 340 matches the fingerprint image rotated by the fingerprint rotator 320 and the registered fingerprint image stored in the memory 110. When the input fingerprint image is consistent with the registered fingerprint image, the fingerprint authenticator 340 transmits output information on completion of the fingerprint authentication to the display controller 260, and, when the input fingerprint image is not consistent with the registered fingerprint image, the fingerprint authenticator 340 transmits output information on retrial of the fingerprint authentication to the display controller 360.

The display controller 360 controls to output the output information on the fingerprint authentication provided by the fingerprint authenticator 340 to the touch screen 190 in graphics. However, this should not be considered as limiting and the output information on the fingerprint authentication may be output by means of an LED, a vibration or voice data.

The elements of the processor 122 have been illustrated and explained, but are not limited to those described above. For example, the processor 122 may include a larger or smaller number of elements than those illustrated in the drawing.

Figure 6A:
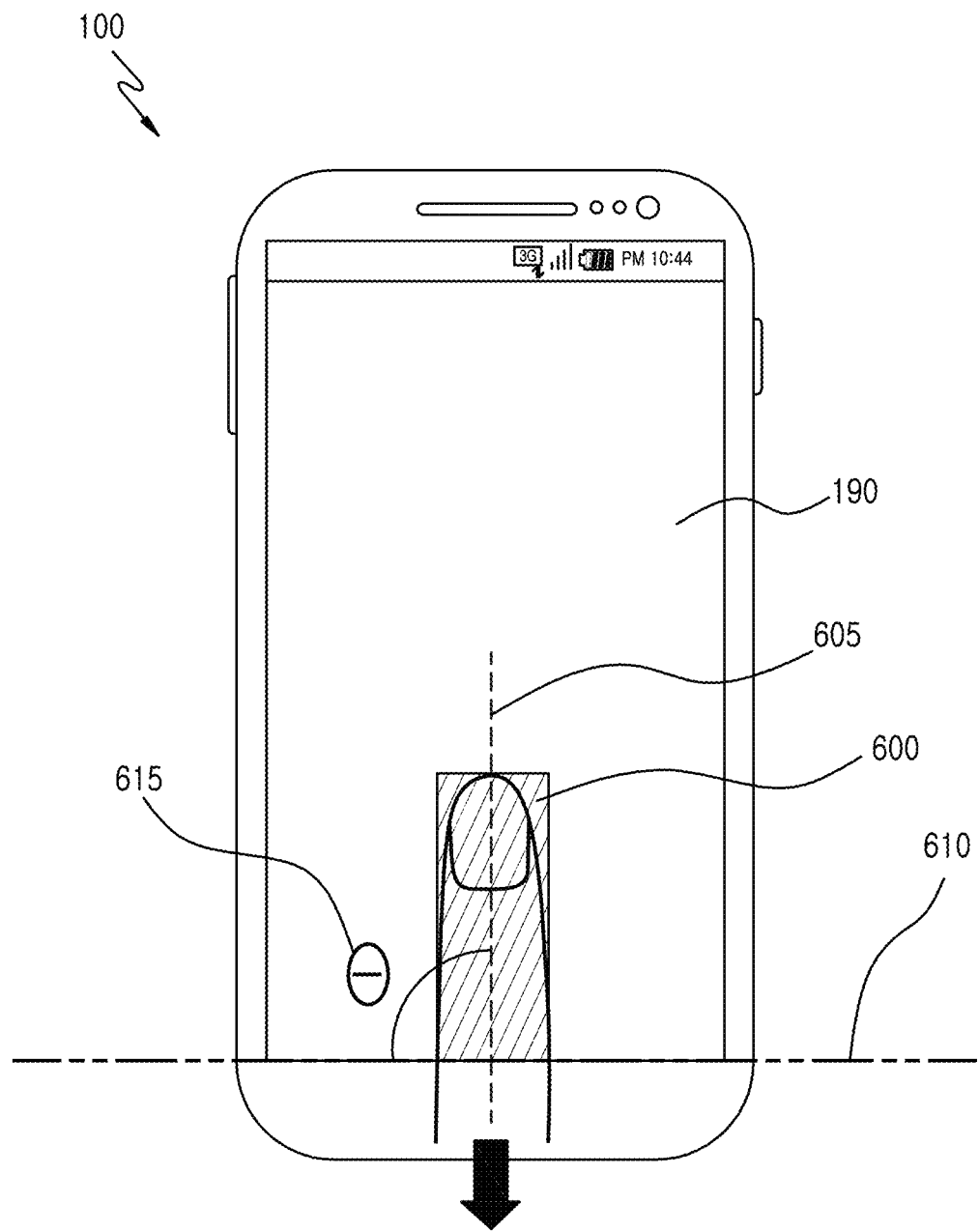
FIGS. 6A to 6C are views illustrating an example of a change in a hover area, according to a finger's movement, according to an embodiment of the present invention.
Figure 6B:
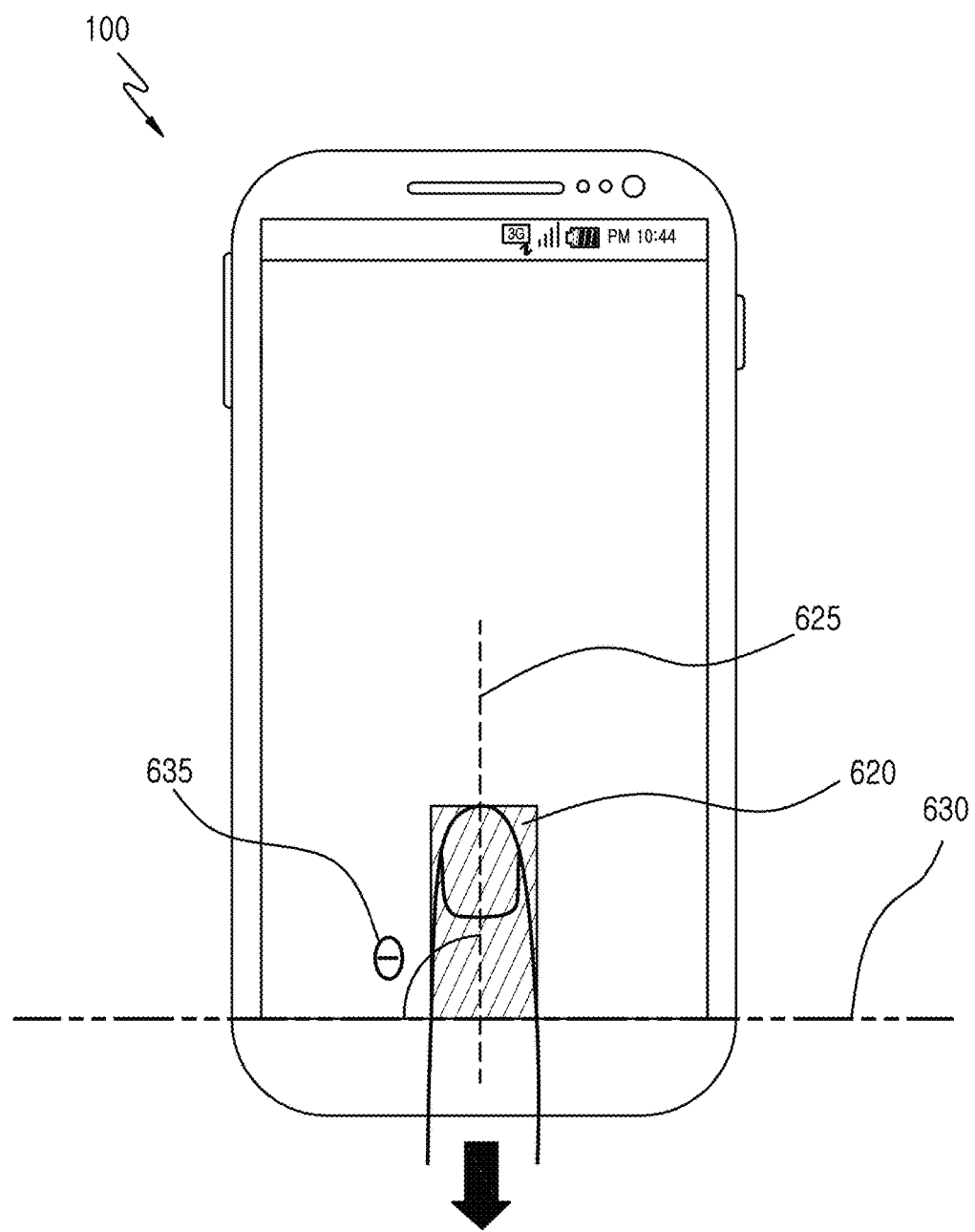
Figure 6C:
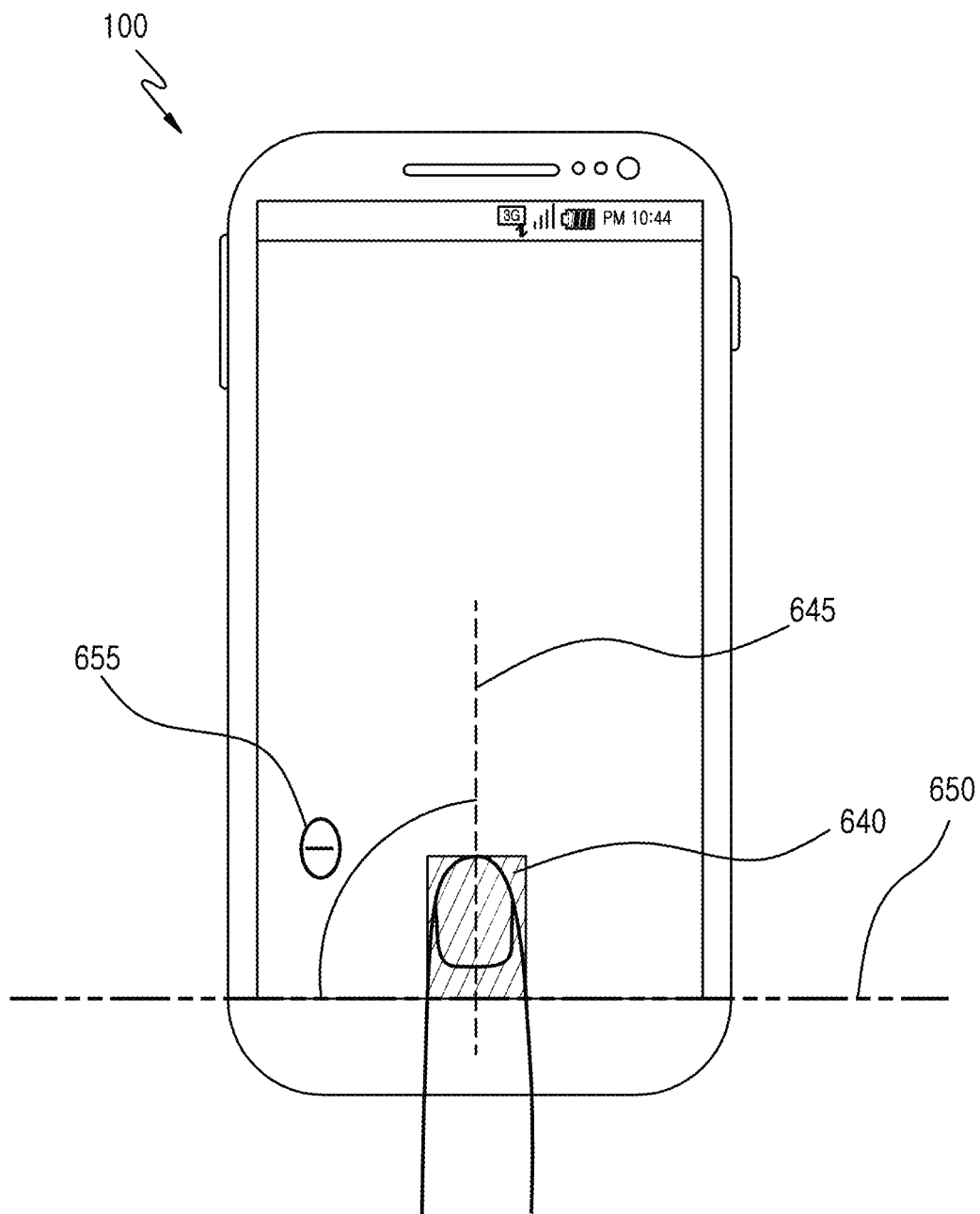

FIGS. 6A to 6C are views illustrating an example of a change in a hover area, according to a finger's movement, according to an embodiment of the present invention.

Referring to FIG. 6A, the electronic device 100 senses a finger approaching the touch screen 190 within a predetermined distance. A hover area 600 of the finger may be determined using the method described above with reference to FIGS. 5A to 5C.

When the finger is in the state of FIG. 6A, and moves downward, as shown in FIG. 6B, an angle 635 between a center line 625 of a hover area 620 of the moved finger and a horizontal line 630 parallel to the fingerprint sensor is equal to an angle 615 between a center line 605 of the hover area 600 prior to the finger being moved and a horizontal line 610 parallel to the fingerprint sensor. However, the hover area 620 of the moved finger and its size may be different from the hover area 600 and its size prior to the finger being moved.

In addition, when the finger is in the state of FIG. 6B and further moves down, as shown in FIG. 6C, an angle 655 between a center line 645 of a hover area 640 of the moved finger and a horizontal line 650 parallel to the fingerprint sensor may be equal to the angle 635 between the center line 625 of the hover area 620 prior to the finger being moved and the horizontal line 630 parallel to the fingerprint sensor. However, the hover area 630 of the moved finger and its size may be different from the hover area 620 and its size prior to the finger being moved.

In the above-described method, the electronic device 100 can estimate a finger's movement based on a change in the hover area caused by the finger's movement. Accordingly, the electronic device 100 can estimate a finger's movement in advance and may identify an input direction of a fingerprint input to the fingerprint sensor 210.

Figure 7A:
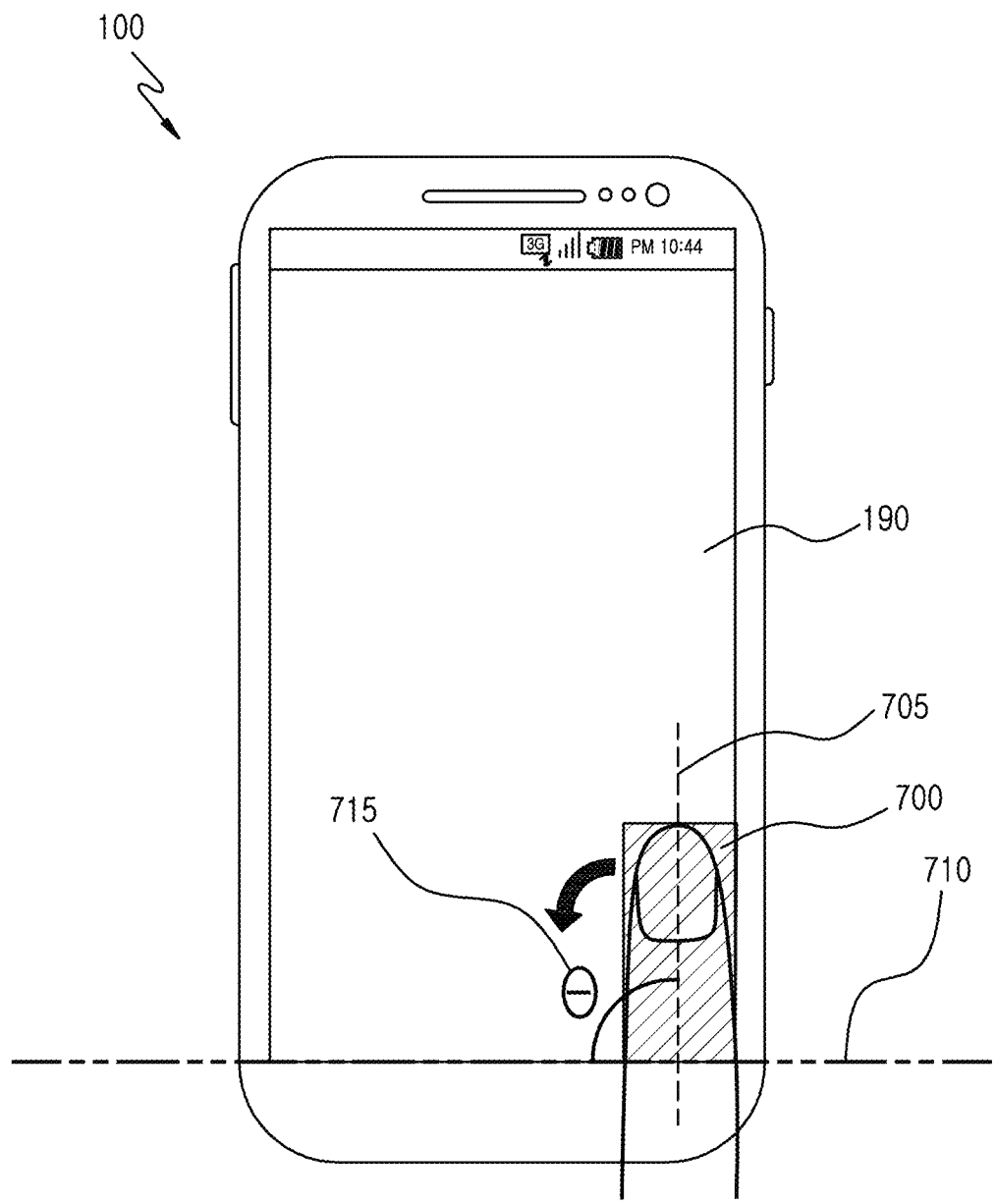
FIGS. 7A to 7C are views illustrating an example of a change in a hover area, according to a finger's movement, according to another embodiment of the present invention.
Figure 7B:
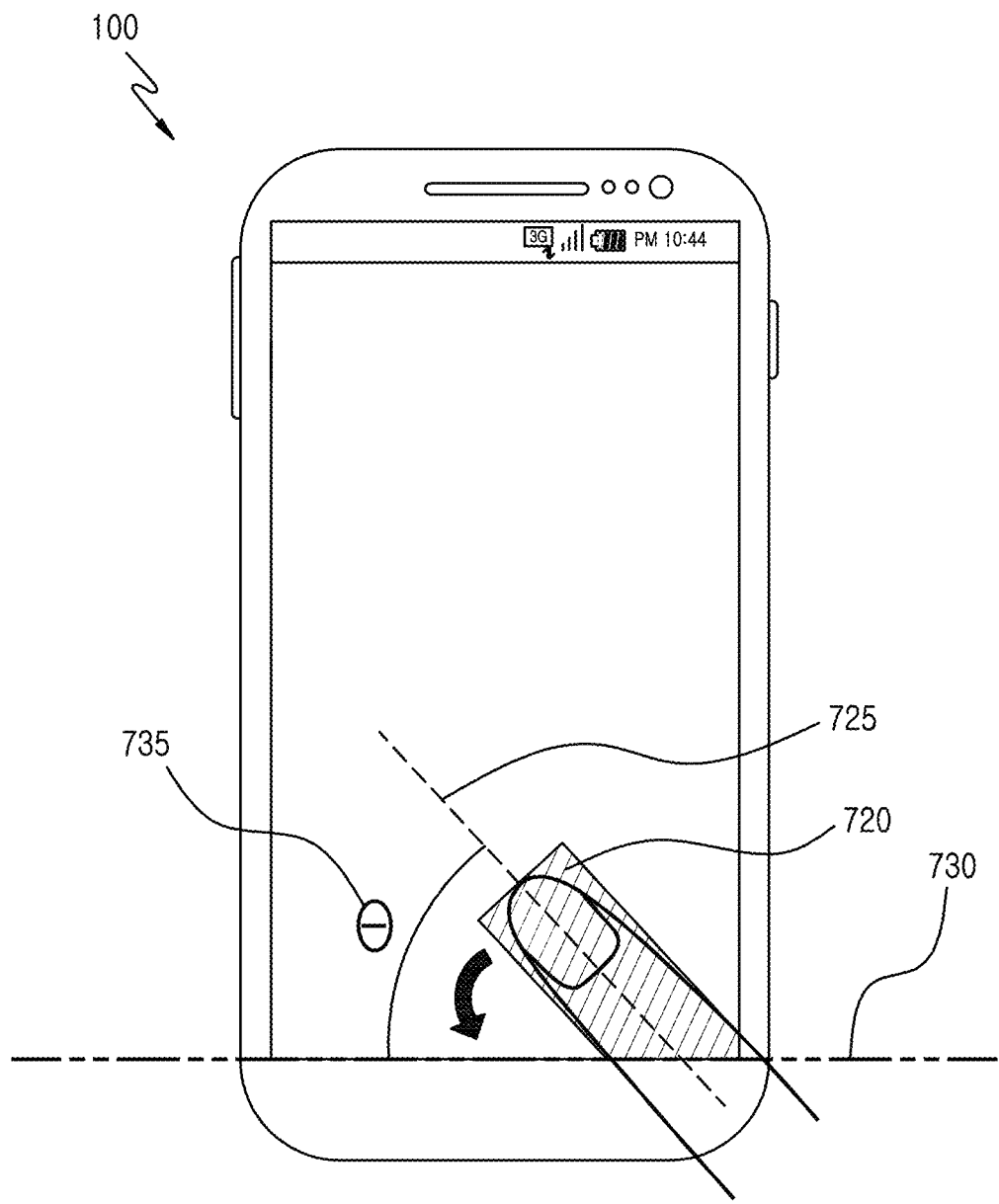
Figure 7C:
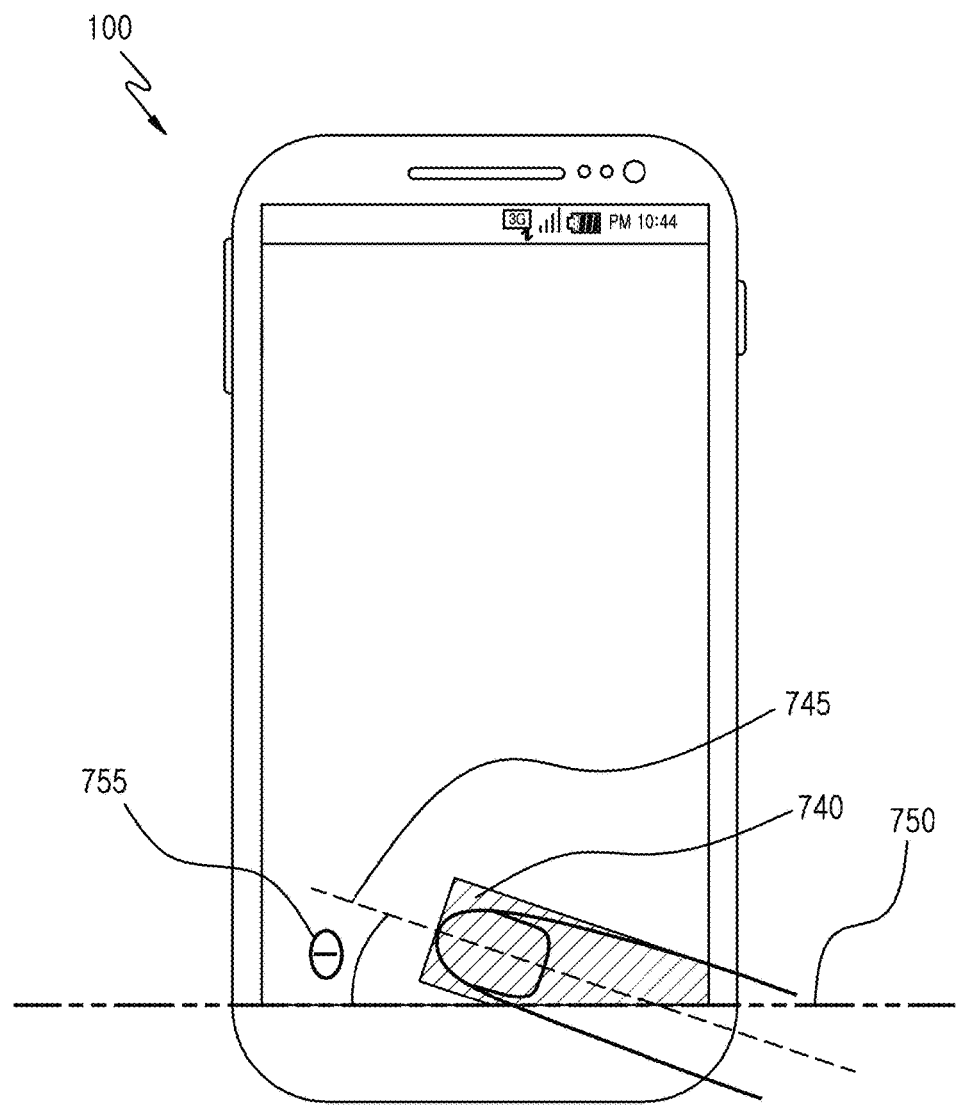

FIGS. 7A to 7C are views illustrating an example of a change in a hover area, according to a finger's movement, according to another embodiment of the present invention.

Referring to FIG. 7A, the electronic device 100 senses a finger approaching the touch screen 190 within a predetermined distance. A hover area 700 of the finger may be determined using the method described above with reference to FIGS. 5A to 5C.

When the finger is in the state of FIG. 7A and is rotated in a counter clockwise direction, as shown in FIG. 7B, an angle 735 between a center line 725 of a hover area 720 of the rotated finger and a horizontal line 730 parallel to the fingerprint sensor may be different from an angle 715 between the center line 705 of the hover area 700 prior to the finger being rotated and a horizontal line 710 parallel to the fingerprint sensor. In addition, the hover area 720 of the rotated finger and the hover area 700 prior to the finger being rotated may be different from each other, but may be similar to each other in the total areas of the hover areas 700 and 720.

In addition, when the finger is in the state of FIG. 7B and is further rotated in the counter clockwise direction, as shown in FIG. 7C, an angle 755 between a center line 745 of a hover area 740 of the rotated finger and a horizontal line 750 parallel to the fingerprint sensor may be different from the angle 735 between the center line 725 of the hover area 720 prior to the finger being rotated and the horizontal line 730 parallel to the fingerprint sensor. In addition, the hover area 740 of the rotated finger and the hover area 720 prior to the finger being rotated may be different from each other, but may be similar to each other in the total areas of the hover areas 720 and 740.

In the above-described method, the electronic device 100 can estimate a finger's movement based on a change in the hover area caused by the finger's movement. Accordingly, the electronic device 100 can estimate a finger's movement in advance and can identify an input direction of a fingerprint input to the fingerprint sensor 210.

Figure 10:
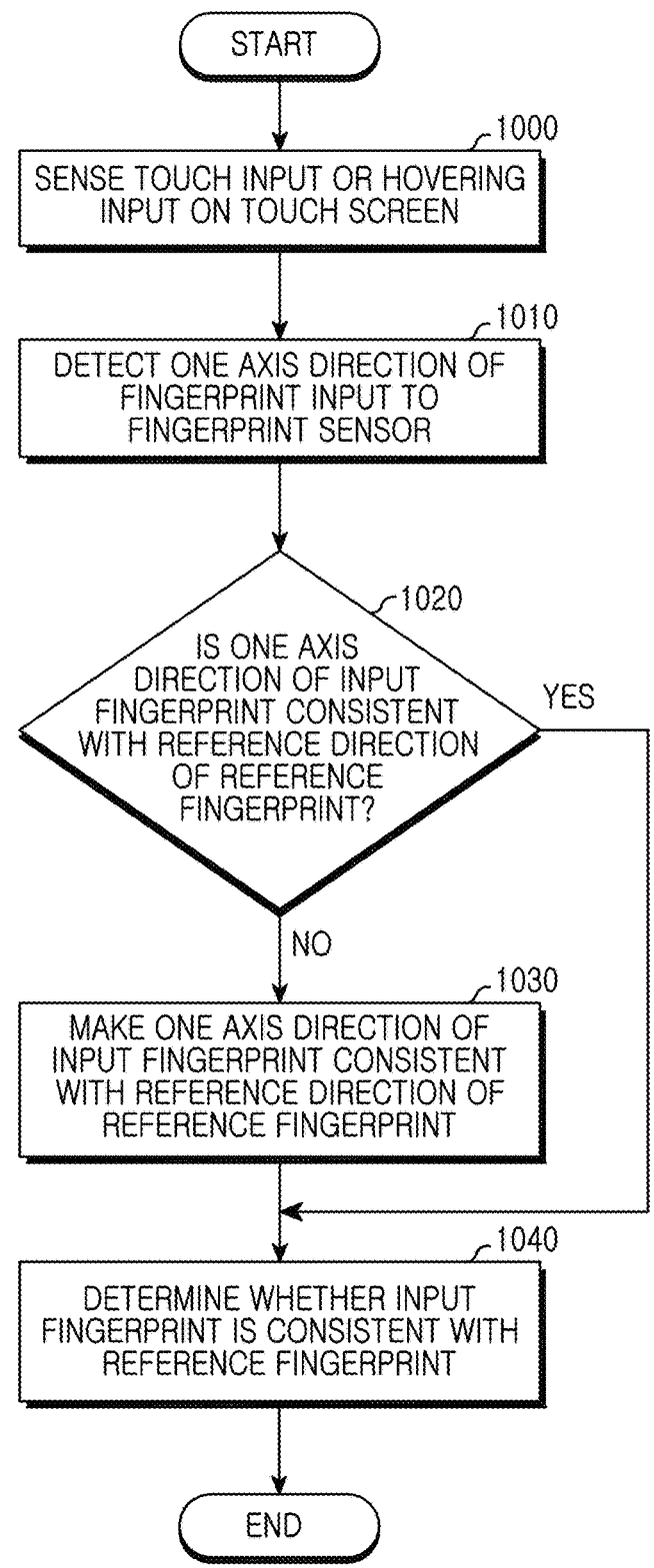
FIG. 10 is a flowchart illustrating a method for operating an electronic device, according to an embodiment of the present invention.

FIG. 10 is a flowchart illustrating a method for operating an electronic device 100, according to an embodiment of the present invention.

Referring to FIG. 10, the electronic device 100 senses a touch input or a hovering input on the touch screen 190 in step 1000.

The touch screen 190 senses a touch or hovering based on a change in a physical quantity (e.g., a capacitance or resistance, etc.) caused by a finger. For example, the touch screen 190 determines a hover area by sensing a finger approaching within a predetermined distance.

The electronic device 100 detects one axis direction of a fingerprint input to the fingerprint sensor 210 in step 1010.

The fingerprint input angle detector 300 of the electronic device 100 acquires location information of the finger via the touch screen 190.

As shown in FIG. 5B, where the surface of the touch screen 190 is illustrated in a grid pattern including an x-axis and a y-axis, the touch screen 190 detects location coordinates 510 of the finger F contacting the surface of the touch screen 190 or approaching within a predetermined distance.

The fingerprint input angle detector 300 defines a hover area 530 (or a touch area) based on a closed curve 520 connecting outermost location coordinates (e.g., 513, etc.) from among the location coordinates (e.g., 511, 513, etc.) provided by the touch screen 190. The hover area 530 may be defined by, but not limited to, the number of pixels located in the closed curve 520.

As shown in FIG. 5C, the fingerprint input angle detector 300 sets a virtual center line 540 on a center of the hover area 530 according to the defined hover area 530. In addition, the fingerprint input angle detector 300 determines in which direction one axis (e.g., a major axis) of the hover area 530 is oriented based on the defined hover area 530. Accordingly, the fingerprint input angle detector 300 sets the center line 540 connecting from the upper left side to the lower right side through the defined hover area 530.

Alternatively, the fingerprint input angle detector 300 may find a plurality of lines parallel to the above-described direction from among the closed lines 520 and set the line located in the center from among the plurality of lines as the virtual center line 540.

The electronic device 100 determines whether the one axis direction of the input fingerprint is consistent with a reference direction of a reference fingerprint in operation 1020. The reference fingerprint is a fingerprint which has been registered during a user registration process and the reference direction refers to a direction of one axis of the reference fingerprint.

The fingerprint input angle detector 300 detects an angle 560 between the determined center line 540 and the horizontal line 550 parallel to the fingerprint sensor. The fingerprint input angle detector 300 determines whether the input angle 560 is consistent with the reference input angle by comparing the input angle 560 of the input fingerprint and the reference input angle of the registered reference fingerprint.

When the one axis direction of the input fingerprint is consistent with the reference direction of the reference fingerprint, the electronic device 100 performs step 1040.

When the one axis direction of the input fingerprint is not consistent with the reference direction of the reference fingerprint, the electronic device 100 makes the one axis direction of the input fingerprint consistent with the reference direction of the reference fingerprint in step 1030.

The fingerprint rotator 320 of the electronic device 100 makes one axis direction of the fingerprint image input to the fingerprint sensor 210 consistent with the reference direction of the registered reference fingerprint image according to the fingerprint information provided by the fingerprint input angle detector 300.

When a reference fingerprint image is registered with reference to one axis direction, as shown in FIG. 8A, and a fingerprint image is input to the fingerprint sensor 210, as shown in FIG. 9A, the fingerprint rotator 320 makes one axis direction of the input fingerprint image consistent with one axis direction of the registered fingerprint image by rotating the input fingerprint image by a predetermined angle. Accordingly, the input fingerprint image is rotated as shown in FIG. 9B and the rotated fingerprint image matches the registered fingerprint image with reference to one axis direction.

Alternatively, when a reference fingerprint image is registered with reference to one axis direction, as shown in FIG. 8A, and a fingerprint image is input to the fingerprint sensor 210, as shown in FIG. 9A, the fingerprint rotator 320 makes one axis direction of the registered fingerprint image consistent with one axis direction of the input fingerprint image by rotating the registered fingerprint image by a predetermined angle. Accordingly, the registered fingerprint image is rotated, as shown in FIG. 8B, and the rotated fingerprint image matches the input fingerprint image with reference to one axis direction.

The electronic device 100 determines whether the input fingerprint is consistent with the reference fingerprint in step 1040.

The fingerprint authenticator 340 of the electronic device 100 matches the fingerprint image rotated by the fingerprint rotator 320 and the registered fingerprint image stored in the memory 110. When the input fingerprint image is consistent with the registered fingerprint image, the fingerprint authenticator 340 transmits output information on completion of the fingerprint authentication to the display controller 260, and, when the input fingerprint image is not consistent with the registered fingerprint image, the fingerprint authenticator 340 transmits output information on retrial of the fingerprint authentication to the display controller 360.

An instruction set for each operation is stored in the above-described memory 110 as one or more modules. In this case, the modules stored in the memory 110 may be executed by one or more processors 122.

Figure 11:
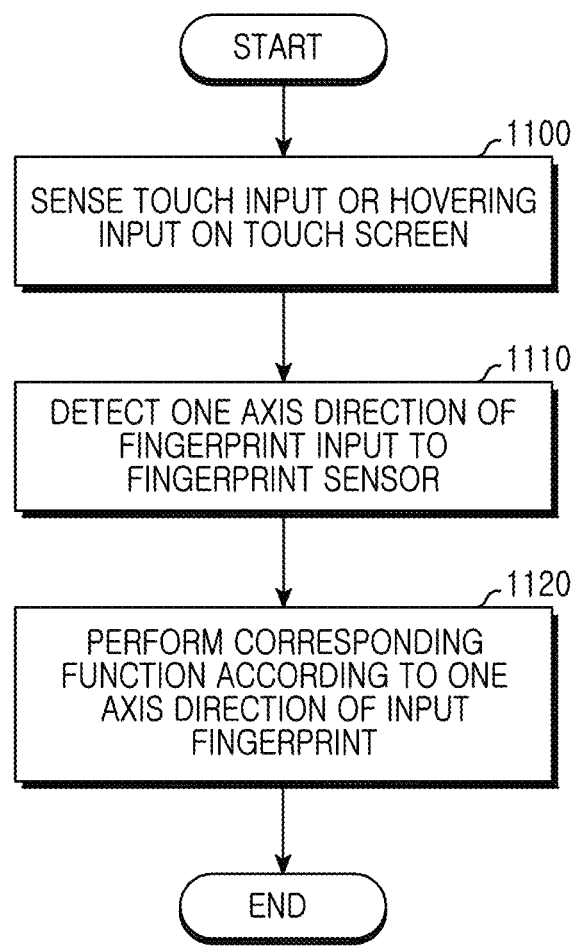
FIG. 11 is a flowchart illustrating a method for operating an electronic device, according to another embodiment of the present invention.

FIG. 11 is a flowchart illustrating a method for operating an electronic device, according to another embodiment of the present invention.

Referring to FIG. 11, the electronic device 100 senses a touch input or a hovering input on the touch screen 190 in step 1100.

The touch screen 190 senses a touch or hovering based on a change in a physical quantity (e.g., a capacitance or resistance, etc.) caused by a finger. For example, the touch screen 190 determines a hover area by sensing a finger approaching within a predetermined distance.

The electronic device 100 detects one axis direction of a fingerprint input to the fingerprint sensor 210 in step 1110.

The fingerprint input angle detector 300 of the electronic device 100 acquires location information of the finger via the touch screen 190.

As shown in FIG. 5B, where the surface of the touch screen 190 is illustrated in a grid pattern including an x-axis and a y-axis, the touch screen 190 detects location coordinates 510 of the finger F contacting the surface of the touch screen 190 or approaching within a predetermined distance.

The fingerprint input angle detector 300 defines a hover area 530 (or a touch area) based on a closed curve 520 connecting outermost location coordinates (e.g., 513, etc.) from among the location coordinates (e.g., 511, 513, etc.) provided by the touch screen 190. The hover area 530 may be defined by, but not limited to, the number of pixels located in the closed curve 520.

As shown in FIG. 5C, the fingerprint input angle detector 300 sets a virtual center line 540 on a center of the hover area 530 according to the defined hover area 530. In addition, the fingerprint input angle detector 300 determines in which direction one axis (e.g., a major axis) of the hover area 530 is oriented based on the defined hover area 530. Accordingly, the fingerprint input angle detector 300 sets the center line 540 connecting from the upper left side to the lower right side through the defined hover area 530.

Alternatively, the fingerprint input angle detector 300 may find a plurality of lines parallel to the above-described direction from among the closed lines 520 and set the line located in the center from among the plurality of lines as the virtual center line 540.

The electronic device 100 performs a function corresponding to the one axis direction of the input fingerprint in step 1120.

The electronic device 100 performs a predetermined function according to the one axis direction of the fingerprint input to the fingerprint sensor 210 in the above-described method. For example, although not limited thereto, the predetermined function may include unlocking the electronic device 100 or executing a specific application.

An instruction set for each operation is stored in the above-described memory 110 as one or more modules. In this case, the modules stored in the memory 110 may be executed by one or more processors 122.

Figure 12:
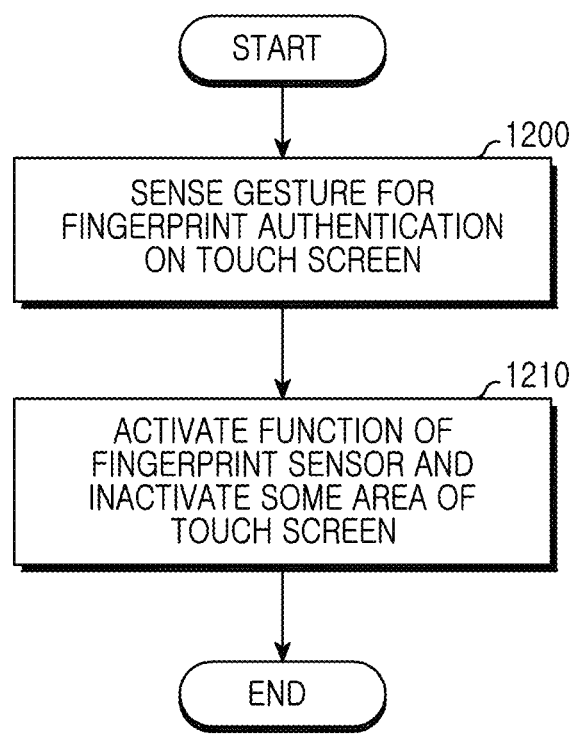
FIG. 12 is a flowchart illustrating a method for operating an electronic device, according to another embodiment of the present invention.

FIG. 12 is a flowchart illustrating a method for operating an electronic device 100 according to another embodiment of the present invention.

Referring to FIG. 12, the electronic device 100 senses a gesture for fingerprint authentication on the touch screen 190 in step 1200.

The gesture for the fingerprint authentication may include a touch input or a hovering input of a finger over the fingerprint sensor 210. For example, when the fingerprint sensor 210 is installed in the proximity of the touch screen 190, the electronic device 100 senses a finger gesture approaching the fingerprint sensor 210. The electronic device 100 determines whether the gesture is the gesture for the fingerprint authentication or not by determining a moving speed of the finger. However, this should not be considered as limiting and the gesture for the fingerprint authentication may be set variously.

The electronic device 100 activates a function of the fingerprint sensor 210 and inactivates some area of the touch screen 190 in step 1210.

When the electronic device 100 senses a gesture for fingerprint authentication, the electronic device 100 readies the fingerprint sensor 210 for fingerprint input. In addition, the electronic device 100 may prevent malfunction beforehand by inactivating some area of the touch screen 190 in the proximity of the fingerprint sensor 210. However, this should not be considered as limiting and the electronic device 100 may further perform an additional operation when the gesture for the fingerprint authentication is sensed.

An instruction set for each operation is stored in the above-described memory 110 as one or more modules. In this case, the modules stored in the memory 110 may be executed by one or more processors 122.

Figure 13:
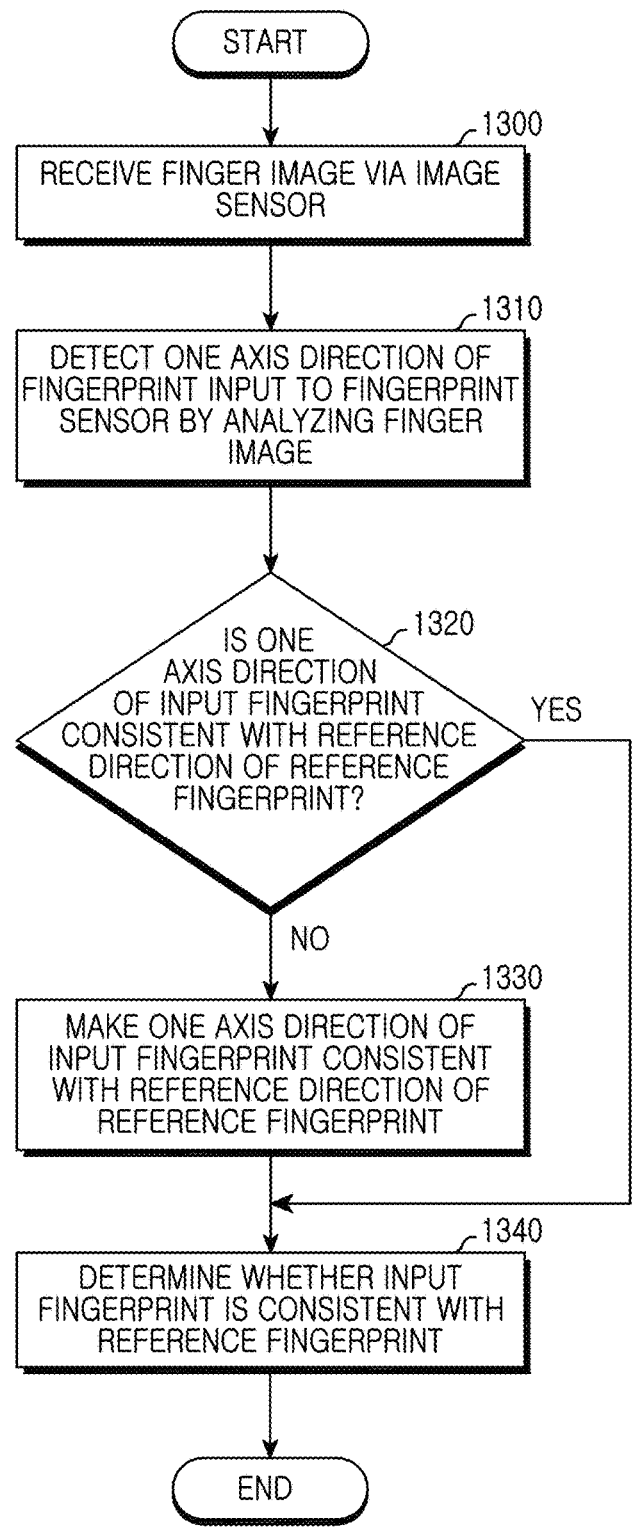
FIG. 13 is a flowchart illustrating a method for operating an electronic device, according to various embodiments of the present invention.
Figure 14A:
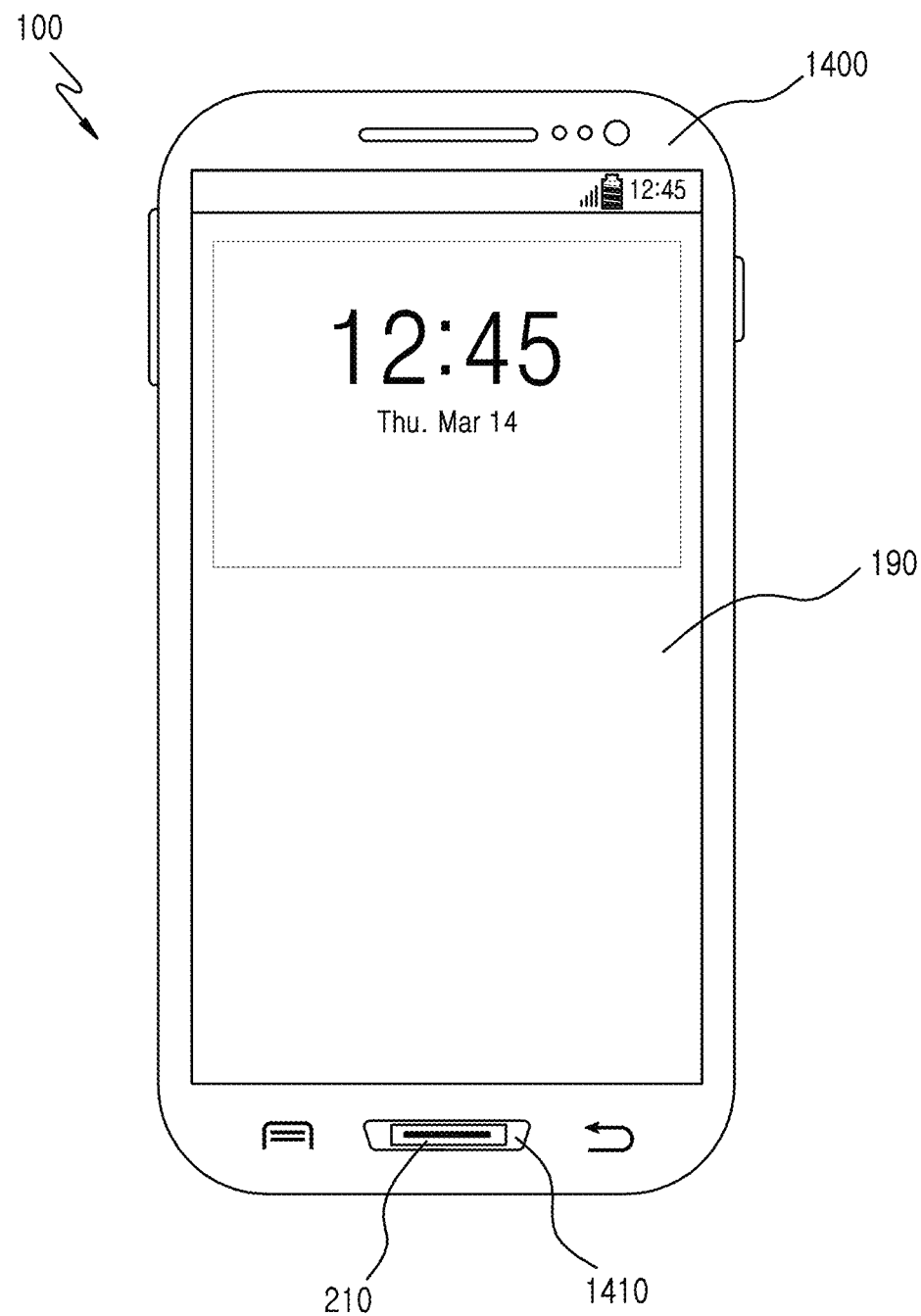
FIGS. 14A to 14E are views illustrating a location of a fingerprint sensor installed in an electronic device, according to an embodiment of the present invention.
Figure 14B:
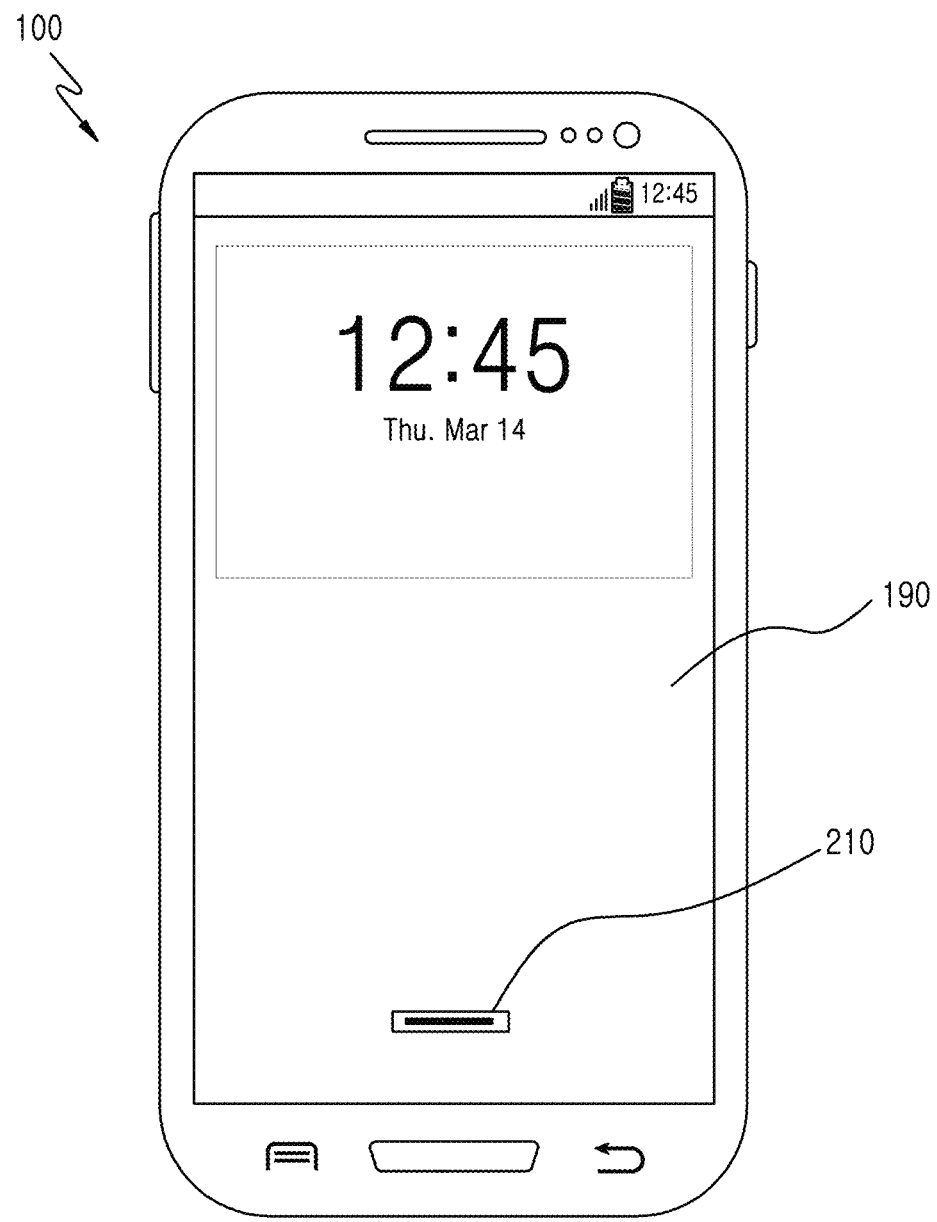
Figure 14C:
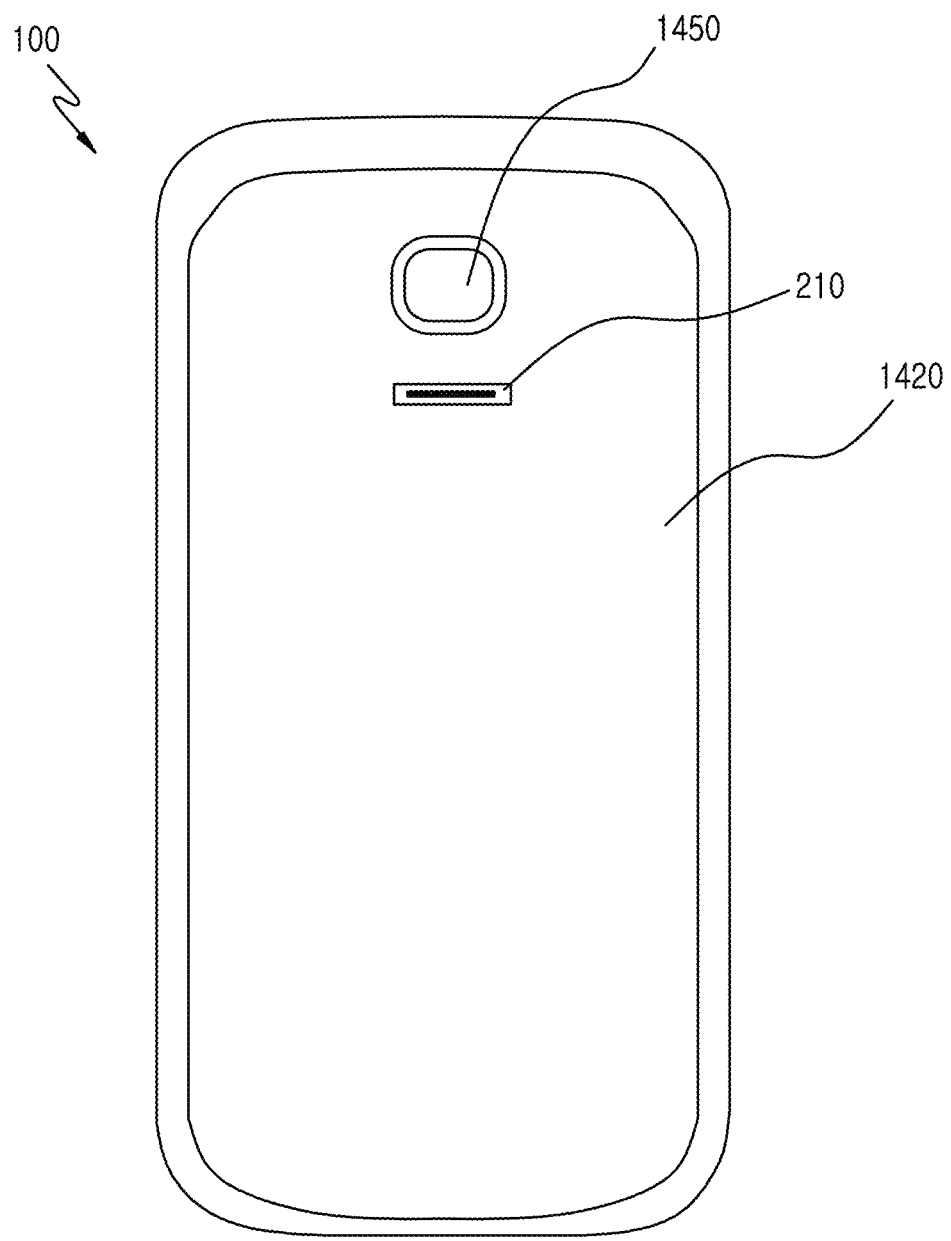
Figure 14D:
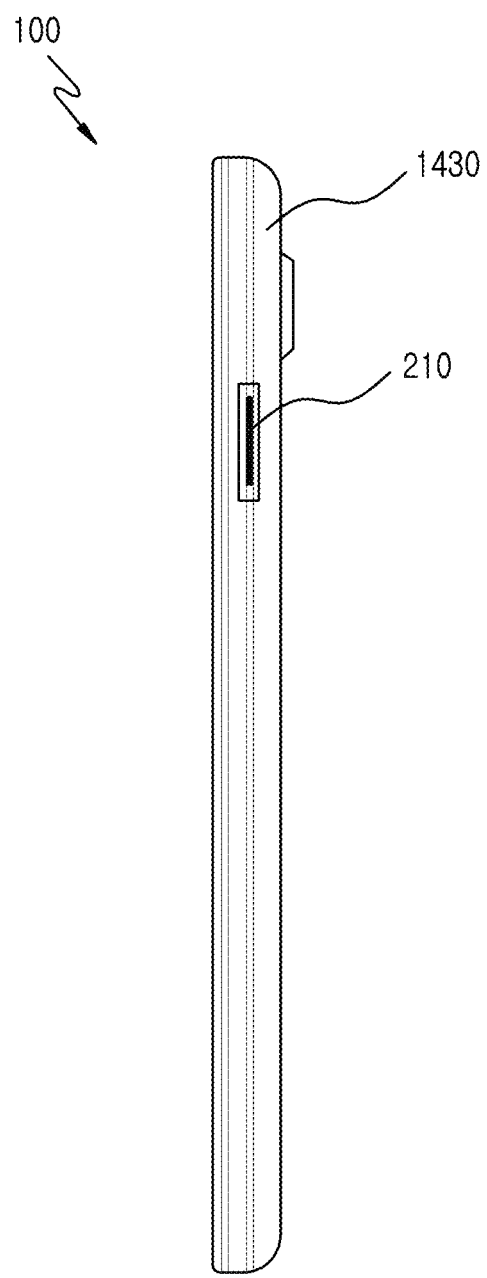
Figure 14E:
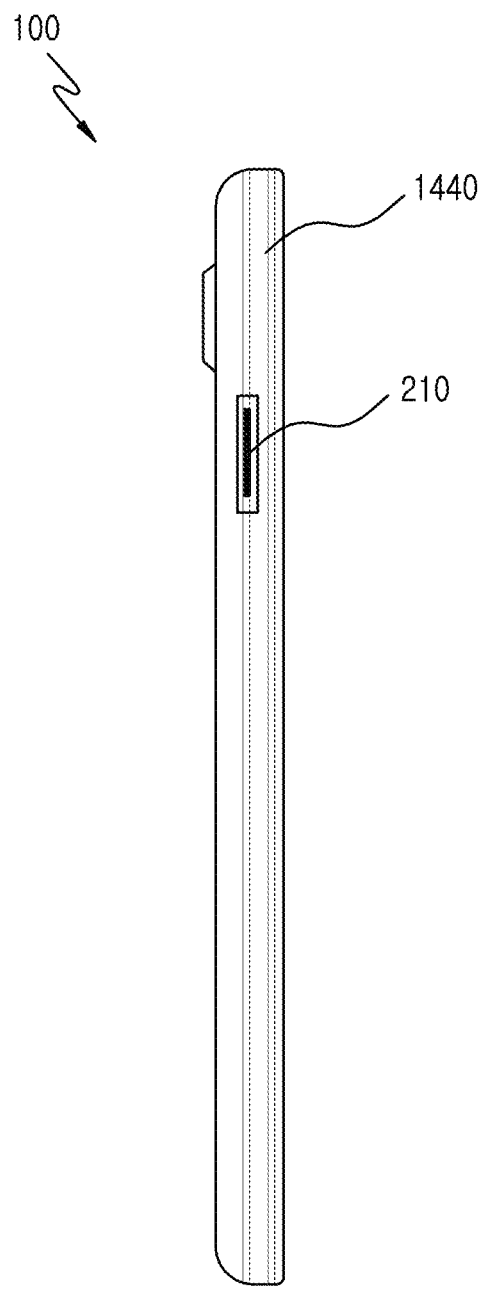

FIG. 13 is a flowchart illustrating a method for operating an electronic device, according to various embodiments of the present invention.

Referring to FIG. 13, the electronic device 100 receives a finger image via an image sensor in step 1300.

The electronic device 100 acquires the finger image by using at least one camera device 130. Such a camera device 130 may be installed on some area of at least one surface from among a front surface, a rear surface, a right surface, and a left surface of the electronic device 100.

The electronic device 100 detects one axis direction of a fingerprint input to the fingerprint sensor 210 by analyzing the finger image in step 1310.

The fingerprint input angle detector 300 acquires location information of the finger by using the camera device 130. In this case, the camera device 130 may be installed in the proximity of the fingerprint sensor 210 of the electronic device 100. The camera device 130 senses a movement of the finger by photographing a subject approaching the camera device 130 by using a wide-angle lens.

The camera device 130 recognizes a characteristic point of the finger or a fingerprint image and tracks the finger, and provides the finger image to the fingerprint input angle detector 300. The fingerprint input angle detector 300 sets an outline on the finger image and sets a virtual center line corresponding to one axis of the outline.

The electronic device 100 determines whether the one axis direction of the input fingerprint is consistent with a reference direction of a reference fingerprint in step 1320. The reference fingerprint is a fingerprint which has been registered during a user registration process and the reference direction refers to a direction of one axis of the reference fingerprint.

The fingerprint input angle detector 300 detects an angle between the determined center line and a horizontal line parallel to the camera device 130. The fingerprint input angle detector 300 determines whether the input angle is consistent with a reference input angle by comparing the input angle of the input fingerprint and a reference input angle of a registered reference fingerprint.

When the one axis direction of the input fingerprint is consistent with the reference direction of the reference fingerprint, the electronic device 100 performs step 1340.

When the one axis direction of the input fingerprint is not consistent with the reference direction of the reference fingerprint, the electronic device 100 makes the one axis direction of the input fingerprint consistent with the reference direction of the reference fingerprint in step 1330.

The fingerprint rotator 320 of the electronic device 100 makes one axis direction of the fingerprint image input to the fingerprint sensor 210 consistent with the reference direction of the registered reference fingerprint image according to the fingerprint information provided by the fingerprint input angle detector 300.

When a reference fingerprint image is registered with reference to one axis direction, as shown in FIG. 8A, and a fingerprint image is input to the fingerprint sensor 210, as shown in FIG. 9A, the fingerprint rotator 320 makes one axis direction of the input fingerprint image consistent with one axis direction of the registered fingerprint image by rotating the input fingerprint image by a predetermined angle. Accordingly, the input fingerprint image is rotated as shown in FIG. 9B and the rotated fingerprint image matches the registered fingerprint image with reference to one axis direction.

Alternatively, when a reference fingerprint image is registered with reference to one axis direction as shown in FIG. 8A and a fingerprint image is input to the fingerprint sensor 210 as shown in FIG. 9A, the fingerprint rotator 320 makes one axis direction of the registered fingerprint image consistent with one axis direction of the input fingerprint image by rotating the registered fingerprint image by a predetermined angle. Accordingly, the registered fingerprint image is rotated as shown in FIG. 8B and the rotated fingerprint image matches the input fingerprint image with reference to one axis direction.

The electronic device 100 determines whether the input fingerprint is consistent with the reference fingerprint in step 1340.

The fingerprint authenticator 340 of the electronic device 100 matches the fingerprint image rotated by the fingerprint rotator 320 and the registered fingerprint image stored in the memory 110. When the input fingerprint image is consistent with the registered fingerprint image, the fingerprint authenticator 340 transmits output information on completion of the fingerprint authentication to the display controller 260, and, when the input fingerprint image is not consistent with the registered fingerprint image, the fingerprint authenticator 340 transmits output information on retrial of the fingerprint authentication to the display controller 360.

An instruction set for each operation is stored in the above-described memory 110 as one or more modules. In this case, the modules stored in the memory 110 may be executed by one or more processors 122.

FIGS. 14A to 14E are views illustrating a location of the fingerprint sensor installed in an electronic device, according to an embodiment of the present invention.

Referring to FIGS. 14A to 14E, the fingerprint sensor 210 may be installed on some area of at least one surface of a front surface 1400, a rear surface 1420, a right surface 1430, and a left surface 1440 of the electronic device 100. Such a fingerprint sensor 210 may include a one-dimensional fingerprint identification sensor or a second-dimensional fingerprint identification sensor of various methods such as an optical method, a thermal method, a capacitive method, an electric field method, etc.

The fingerprint sensor 210 may be installed on an upper portion of a home key 1410 of the electronic device 100 or may be installed on a touch screen 190 area. However, this should not be considered as limiting and the fingerprint sensor 210 may be installed in various locations of the front surface 1400 of the electronic device 100.

Alternatively, the fingerprint sensor 210 may be installed on the front surface 1420, on the right surface 1430, or on the left surface 1440 of the electronic device 100. For example, although not limited thereto, the fingerprint sensor 210 may be installed in the proximity of a rear camera 1450 installed on the rear surface 1420.

Figure 15A:
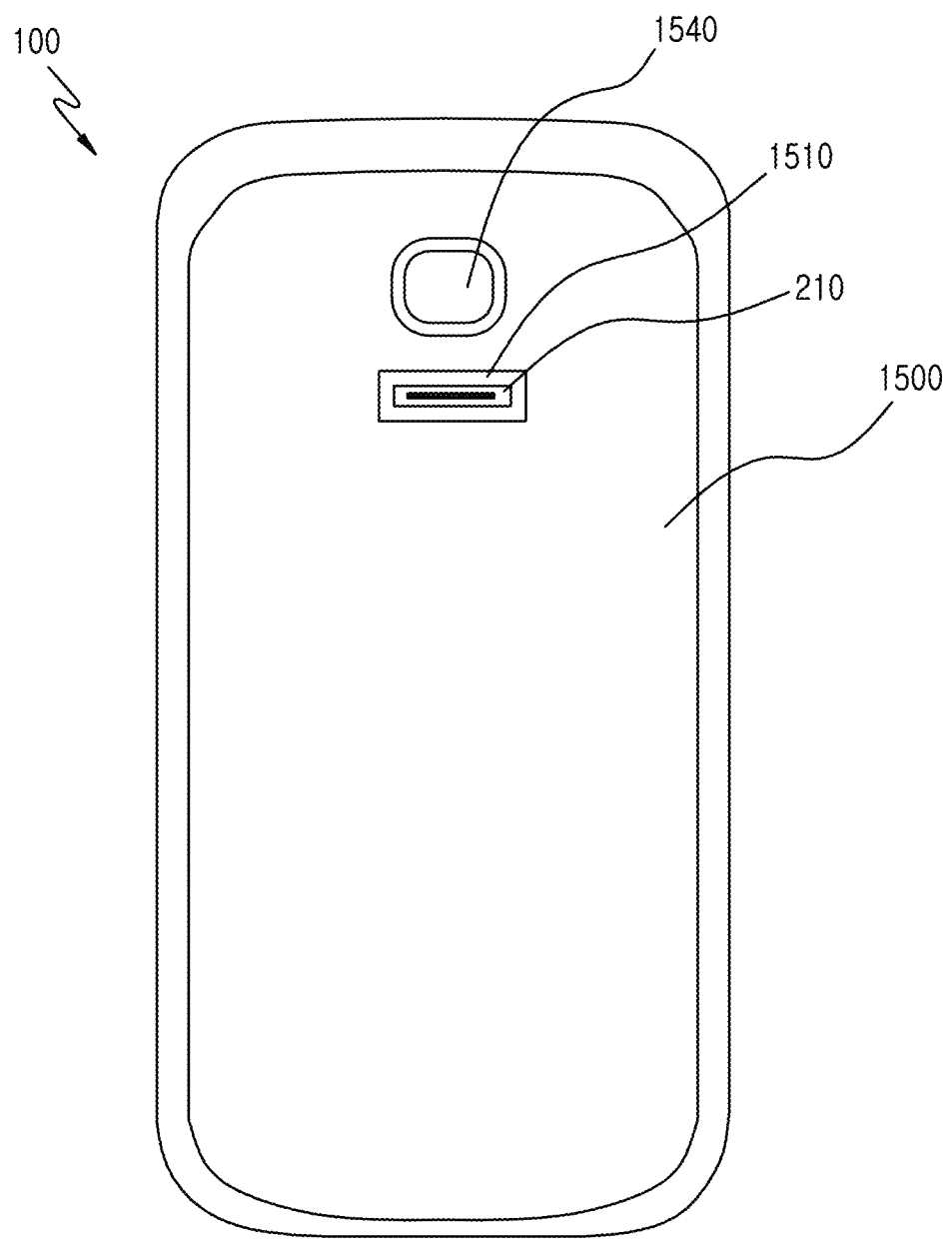
FIGS. 15A to 15C are views illustrating an arrangement of a touch panel including a fingerprint sensor, according to an embodiment of the present invention.
Figure 15B:
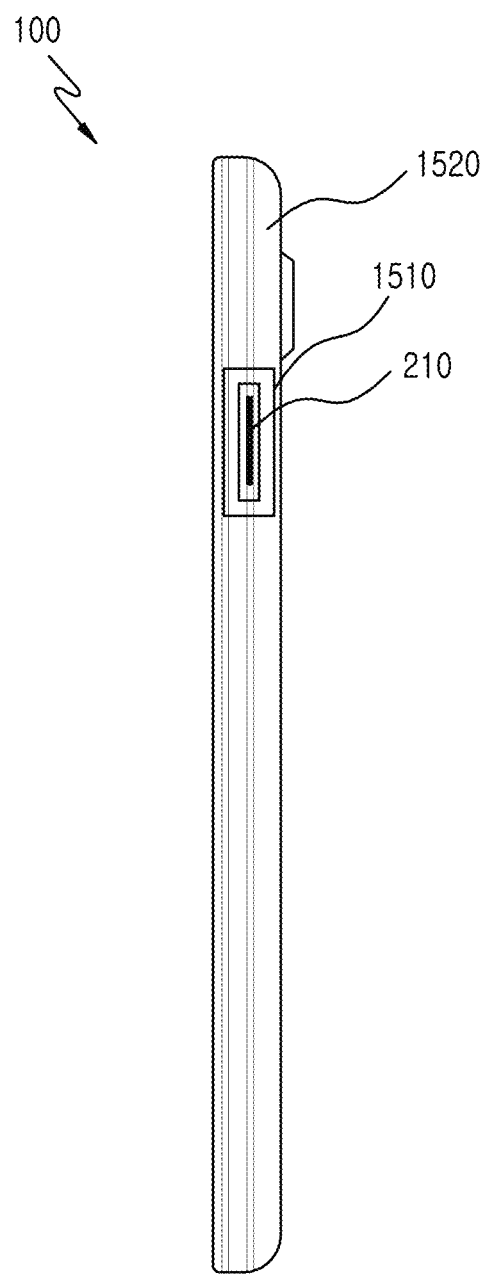
Figure 15C:
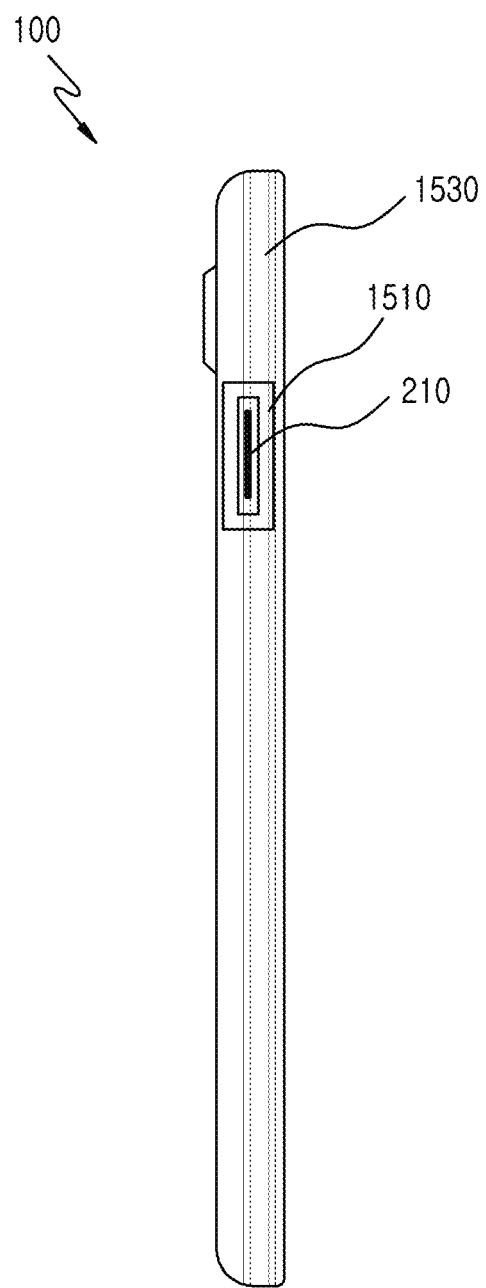

FIGS. 15A to 15C are views illustrating an arrangement of a touch panel including the fingerprint sensor, according to an embodiment of the present invention.

Referring to FIGS. 15A to 15C, the fingerprint sensor 210 may be installed on an upper portion of the touch panel 1510. The touch panel 1510 may be arranged to enclose the fingerprint sensor 210, and may be installed on some area of at least one surface of a rear surface 1500, a right surface 1520, and a left surface 1530 of the electronic device 100. The touch panel 1510, including the fingerprint sensor 210, may be installed in the proximity of a rear camera 1540 installed on the rear surface 1500 of the electronic device 100. However, this should not be considered as limiting and the touch panel 1510 may be installed in various locations.

Methods based on the embodiments disclosed in the claims and/or specification of the present invention can be implemented in hardware, software, or a combination of both.

When implemented in software, a non-transitory computer readable recording medium for storing one or more programs (i.e., software modules) can be provided. The one or more programs stored in the non-transitory computer readable recording medium are configured for execution performed by one or more processors in an electronic device. The one or more programs include instructions for allowing the electronic device to execute the methods based on the embodiments disclosed in the claims and/or specification of the present invention.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, a plurality of the configured memory may be provided.

Further, the program can be stored in an attachable storage device capable of accessing the electronic device through a communication network such as the Internet, an Intranet, a Local Area Network (LAN), a Wireless LAN (WLAN), or a Storage Area Network (SAN) or a communication network configured by combining the networks. The storage device can access the electronic device 100 via an external port.

In addition, an additional storage device on a communication network may access the electronic device 100.

While the present invention has been particularly shown and described with reference to certain embodiments thereof, it will be understood by those skilled in the art that various changes in form and details may be made therein without departing from the spirit and scope of the present invention as defined by the appended claims.

What is claimed is:

1. A method in an electronic device, the method comprising:
   detecting, by a touch screen, a hovering input of a finger;
   determining, by at least one processor, an angle between a reference axis for reference fingerprint data stored in the electronic device and an axis for the hovering input;
   tracking, by the at least one processor, a change of the angle as the finger approaches a fingerprint sensor;
   detecting, by the fingerprint sensor, a touch input of the finger;
   generating, by the at least one processor, fingerprint data based on the touch input of the finger; and
   authenticating, by the at least one processor, the fingerprint data by modifying at least one of the fingerprint data and the reference fingerprint data based on the change of the angle.

2. The method of claim 1, wherein the hovering input of a finger is detected by an image sensor.

3. The method of claim 2, further comprising determining the axis for the hovering input based on a virtual center line corresponding to a hover area of the hovering input.

4. The method of claim 3, wherein authenticating the fingerprint data comprises rotating the reference fingerprint data or the fingerprint data by using the angle.

5. The method of claim 1, further comprising performing a function corresponding to the axis of the fingerprint data to the fingerprint sensor.

6. The method of claim 1, wherein the fingerprint sensor is in proximity of the touch screen.

7. The method of claim 6, wherein, if the hovering input is sensed at a location in proximity of the fingerprint sensor, the fingerprint sensor is activated.

8. The method of claim 6, wherein, if the hovering input is sensed at a location in the proximity of the fingerprint sensor, at least one function of the touch screen is deactivated.

9. The method of claim 1, wherein the fingerprint sensor is included in a touch panel of the electronic device or in proximity of the touch panel.

10. An electronic device comprising:
    a touch screen configured to detect a hovering input of a finger;
    a fingerprint sensor configured to detect a touch input of the finger; and
    at least one processor configured to:
    determine an angle between a reference for reference fingerprint data stored in the electronic device and an axis for the hovering input,
    track a change of the angle as the finger approaches the fingerprint sensor,
    generate fingerprint data based on the touch input of the finger, and
    authenticate the fingerprint data by modifying at least one of the fingerprint data and the reference fingerprint data based on the change of the angle.

11. The electronic device of claim 10, further comprising an image sensor to detect the hovering input of a finger.

12. The electronic device of claim 11, wherein the processor is further configured to determine the axis for the hovering input based on a virtual center line corresponding to a hover area of the hovering input.

13. The electronic device of claim 12, wherein the processor is further configured to rotate the reference fingerprint data or the fingerprint data by using the angle.

14. The electronic device of claim 10, wherein the processor is further configured to perform a function corresponding to the axis of the fingerprint data to the fingerprint sensor.

15. The electronic device of claim 10, wherein the fingerprint sensor is in proximity of the touch screen.

16. The electronic device of claim 15, wherein, if the hovering input is sensed at a location in proximity of the fingerprint sensor, the fingerprint sensor is activated.

17. The electronic device of claim 15, wherein, if the hovering input is sensed at a location in the proximity of the fingerprint sensor, at least one function of the touch screen is deactivated.

18. The electronic device of claim 10, wherein the fingerprint sensor is included in a touch panel of the electronic device or in proximity of the touch panel.

19. A non-transitory computer readable storage medium which, when being executed by an electronic device, stores one or more programs comprising instructions for allowing the electronic device to:
- detect, by touch screen, a hovering input of a finger;
- determine, by at least one processor, an angle between a reference axis for reference fingerprint data stored in the electronic device and an axis for the hovering input;
- track, by the at least one processor, a change of the angle as the finger approaches a fingerprint sensor;
- detect, by the fingerprint sensor, a touch input of the finger;
- generate, by the at least one processor, fingerprint data based on the touch input of the finger; and
- authenticate, by the at least one processor, the fingerprint data by modifying at least one of the fingerprint data and the reference fingerprint data based on the change of the angle.

* * * * *